(12) United States Patent
Suzuki et al.

(10) Patent No.: US 7,256,815 B2
(45) Date of Patent: Aug. 14, 2007

(54) IMAGE FORMING METHOD, IMAGE FORMING APPARATUS, OPTICAL SCAN DEVICE, AND IMAGE FORMING APPARATUS USING THE SAME

(75) Inventors: Seizo Suzuki, Kanagawa (JP); Masaaki Ishida, Kanagawa (JP); Atsufumi Omori, Kanagawa (JP); Magane Aoki, Kanagawa (JP); Yasuhiro Nihei, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/323,837

(22) Filed: Dec. 20, 2002

(65) Prior Publication Data

US 2003/0156184 A1 Aug. 21, 2003

(30) Foreign Application Priority Data

Dec. 20, 2001 (JP) .............................. 2001-387921
Apr. 30, 2002 (JP) .............................. 2002-129318

(51) Int. Cl.
*B41J 2/435* (2006.01)

(52) U.S. Cl. ..................................................... 347/249

(58) Field of Classification Search ........ 347/233–237, 347/243, 244, 247–252, 258, 115–117, 246–250; 358/494, 474; 372/50; 359/216, 250; 708/276
See application file for complete search history.

(56) References Cited

U.S. PATENT DOCUMENTS

| | | | | |
|---|---|---|---|---|
| 4,251,825 A | * | 2/1981 | Mikami et al. | ............. 347/250 |
| 4,872,065 A | * | 10/1989 | Isono et al. | .................. 358/494 |
| 4,935,891 A | * | 6/1990 | Curry | .......................... 708/276 |
| 4,957,336 A | * | 9/1990 | Hasegawa et al. | ............. 359/17 |
| 4,962,981 A | * | 10/1990 | Murakami et al. | .......... 359/217 |
| 5,138,479 A | * | 8/1992 | Ando | .......................... 359/216 |
| 5,402,436 A | * | 3/1995 | Paoli | ............................ 372/50 |
| 5,671,069 A | * | 9/1997 | Kodama | ..................... 358/474 |
| 5,828,925 A | * | 10/1998 | Yoshizawa | .................... 399/39 |

(Continued)

FOREIGN PATENT DOCUMENTS

JP  2-50176  2/1990

(Continued)

OTHER PUBLICATIONS

U.S. Appl. No. 09/955,181, filed Sep. 19, 2001, Unknown.

(Continued)

*Primary Examiner*—Hai Pham
(74) *Attorney, Agent, or Firm*—Oblon, Spivak, McClelland, Maier & Neustadt, P.C.

(57) ABSTRACT

An optical scan device having an optical deflector reflecting a light beam from a light beam source so as to deflect the light beam and having a surface to be scanned on which information is written such that the light beam deflected by the deflector scans the surface is disclosed. Optical detectors are arranged at least in two locations, a start side of writing and an end side of writing, which locations are outside an effective writing area. A measuring part measures a scan time required by the light beam deflected by the optical deflector to scan a range between the optical detectors. A correcting part corrects each dot position of image data in the effective writing area to an arbitrary position based on a variation amount of the measured scan time.

38 Claims, 29 Drawing Sheets

U.S. PATENT DOCUMENTS

| | | |
|---|---|---|
| 5,933,184 A | 8/1999 | Ishigami et al. |
| 6,038,053 A * | 3/2000 | Kato .................... 359/205 |
| 6,178,031 B1 * | 1/2001 | Rauch et al. ............ 359/216 |
| 6,233,081 B1 | 5/2001 | Suzuki et al. |
| 6,359,717 B2 | 3/2002 | Suzuki et al. |
| 6,376,837 B1 | 4/2002 | Itabashi et al. |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,417,509 B1 | 7/2002 | Atsuumi et al. |
| 6,448,998 B1 | 9/2002 | Suzuki et al. |
| 6,498,617 B1 | 12/2002 | Ishida |
| 6,509,995 B1 | 1/2003 | Suzuki |
| 6,596,985 B2 | 7/2003 | Sakai |
| 6,657,761 B2 | 12/2003 | Suzuki |
| 6,697,181 B2 | 2/2004 | Masuda |
| 2001/0028387 A1 * | 10/2001 | Maeda .................... 347/232 |
| 2002/0080428 A1 | 6/2002 | Suzuki et al. ............ 358/505 |
| 2002/0101642 A1 | 8/2002 | Masuda .................... 359/196 |
| 2002/0135668 A1 | 9/2002 | Takaki et al. |
| 2003/0156184 A1 | 8/2003 | Suzuki et al. |
| 2005/0094234 A1 | 5/2005 | Miyatake et al. |

FOREIGN PATENT DOCUMENTS

| | | |
|---|---|---|
| JP | 03-065917 | 3/1991 |
| JP | 05-045744 | 2/1993 |
| JP | 08-101357 | 4/1996 |
| JP | 9-174917 | 7/1997 |
| JP | 2000-089148 | 3/2000 |
| JP | 2000-162522 | 6/2000 |
| JP | 2000-198235 | 7/2000 |
| JP | 2000-238319 | 9/2000 |
| JP | 2000-280523 | 10/2000 |
| JP | 2000-289251 | 10/2000 |
| JP | 2001-051214 | 2/2001 |
| JP | 2001-100125 | 4/2001 |
| JP | 2001-180043 | 7/2001 |
| JP | 2001-201702 | 7/2001 |
| JP | 2001-264657 | 9/2001 |
| JP | 2002-067384 | 3/2002 |
| JP | 2002-277789 A | 9/2002 |

OTHER PUBLICATIONS

U.S. Appl. No. 10/323,837, filed Dec. 20, 2002, Suzuki et al.
U.S. Appl. No. 10/820,733, filed Apr. 9, 2004, Suhara et al.
U.S. Appl. No. 10/803,042, Mar. 18, 2004, Ishida et al.
U.S. Appl. No. 10/778,032, filed Feb. 17, 2004, Suzuki et al.
U.S. Appl. No. 10/771,521, filed Feb. 5, 2004, Nihei et al.
U.S. Appl. No. 10/743,808, filed Dec. 24, 2003, Suzuki.
U.S. Appl. No. 10/854,268, filed May 27, 2004, Ishida et al.
U.S. Appl. No. 10/892,191, filed Jul. 16, 2004, Suzuki et al.
U.S. Appl. No. 10/942,073, filed Sep. 16, 2004, Ozasa et al.
U.S. Appl. No. 10/953,372, filed Sep. 30, 2004, Nihei et al.
U.S. Appl. No. 10/981,677, filed Nov. 5, 2005, Miyatake et al.
U.S. Appl. No. 11/030,419, filed Jan. 7, 2005, Nihei et al.

* cited by examiner

LINEARITY : ——
fθ CHARACTERISTIC : ----

MAIN SCAN CURVATURE OF FIELD : ----
SUB SCAN CURVATURE OF FIELD : ——

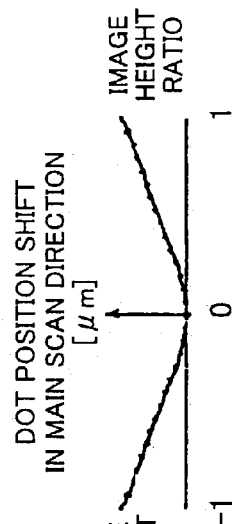
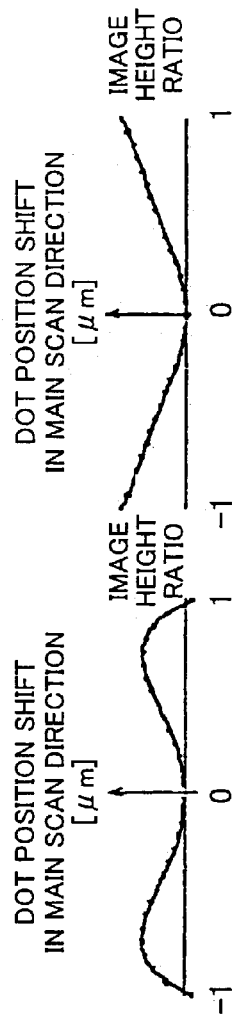
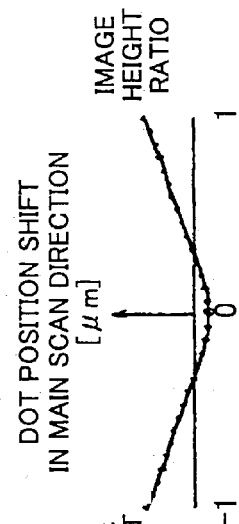
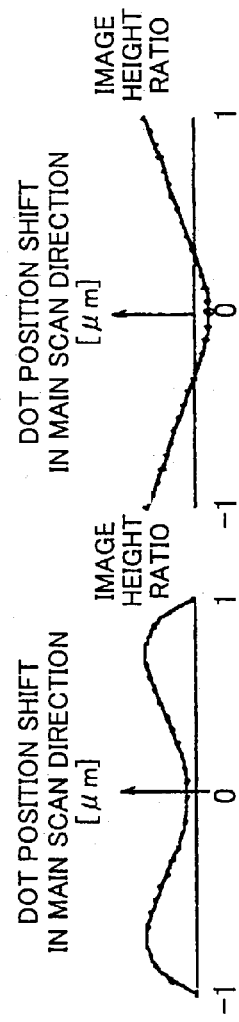
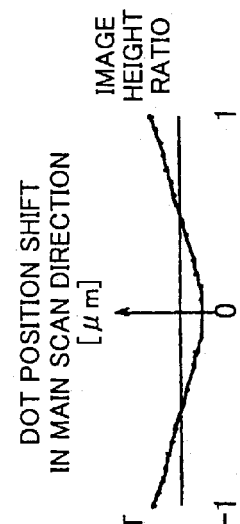
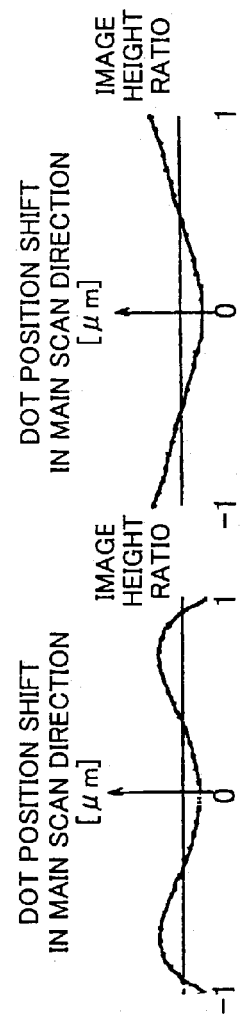

IMAGE FORMING METHOD, IMAGE FORMING APPARATUS, OPTICAL SCAN DEVICE, AND IMAGE FORMING APPARATUS USING THE SAME

BACKGROUND OF THE INVENTION

1. Field of the Invention

The present invention generally relates to image forming apparatuses such as laser printers, laser facsimiles, and digital copying machines, optical scan devices used for such image forming apparatuses, and image forming methods, and more particularly, to an image forming apparatus and image forming method that perform correction of a shift (displacement) of a scan position of laser scan, and pixel position control of optical scan devices.

2. Description of the Related Art

A color laser printer is equipped with a laser scan optical device having laser scan optical units corresponding to four colors (Y: yellow, M: magenta, C: cyan, and BK: black). Each of the laser scan optical units includes a laser diode emitting a laser light beam, a polygon mirror deflecting the laser beam, and the like.

The laser beam emitted from the laser diode is deflected by the polygon mirror after modulation based on image data, and scanned on a photo conductor line by line. This is called main scan, and a 2-dimensional image is formed on the photo conductor by the main scan and sub scan by rotation of the photo conductor. Such a color laser printer has advantages in that modulation for each dot is easy, there is little unevenness of an image in the main scan direction, and the like.

By the way, each of the laser scan optical units corresponding to each of the colors has a different linearity property in the main scan direction according to variations in lens performance and in mounting of the lens. In addition, the linearity property is varied by elongation of a component according to temperature changes. Such variations in the linearity property cause variations in registration.

(Prior Art 1)

For this reason, in order to correct the variation in registration, a conventional color laser printer prints a pattern for detecting the variation in registration, reads the pattern by a CCD or the like, and detects the amount of variation in registration. Then, adjustment of registration is performed by modulating a dot clock and correcting the variation in registration so that shift (displacement) of the print position in the main scan direction is eliminated.

In addition, in a case of a tandem laser scan optical device, color matching of respective laser scan optical units is performed by standardizing the temperature characteristic of each of the laser scan optical units.

However, in the above-described conventional method of adjusting the registration, errors in reading the pattern for detecting the variation in registration are considerable. Thus, there is a problem in that the registration correction cannot be correctly performed, and thus it is impossible to obtain a high quality image. Additionally, since a CCD or the like for reading is required, there is also a problem in that the size of each of the laser scan optical units is increased and cost increases.

Further, in the method of standardizing the temperature characteristic of each of the laser scan optical units so as to perform the color matching of each of the laser scan optical units of the laser scan optical device, it is difficult to standardize the temperature characteristics due to limitations of accuracy of components. That is, the scan position of a laser beam on the photo conductor is shifted according to the temperature changes for each of the laser scan optical units.

A problem will not be caused if the scan position of the laser beam shifted by the temperature changes is the same in each of the laser scan optical units. However, the scan position of the laser beam of each of the laser scan optical units varies according to the characteristic of each of the laser scan optical units and the difference of temperatures between the laser scan optical units. This causes color shift. Especially, the shift of scan position introduced by the difference between the thermal expansion of the lens and that of the chassis or the like has a great influence.

(Prior Art 2)

In Japanese Laid-Open Patent Application No. 2-50176, recording shift is corrected by generating a pattern designation signal corresponding to a detected temperature, generating a line designation signal with a pattern designated by the pattern designation signal during 1-line main scan, and scanning according to image data of a line designated by the line designation signal.

However, in such a correction method, though it is possible to correct the shift in the sub scan direction introduced by the temperature change, there is a problem in that it is impossible to perform correction of shift of registration in the main scan direction.

(Prior Art 3)

Considering such a condition, in the invention in Japanese Laid-Open Patent Application No. 2001-201702, correction of print position is performed such that, in a tandem laser scan optical device, a laser scan optical unit having a temperature sensor is provided for each of the colors Y, M, C and K, the linearity characteristic and data of temperature gradient in the main scan direction that are measured for each of the laser scan optical units are maintained, an amount of correction of print position difference according to an error in mounting fθ lens and temperature changes is calculated, and based on the calculated amount, the modulation of a dot clock and correction of the print position difference are performed.

However, in the prior art 3, the cost is high since the tandem laser scan optical device includes four sets of a light source, a polygon motor, a fθ lens, and a temperature sensor for four colors, that is, Y, M, C and K.

In addition, the tandem laser scan optical device further includes four polygon mirror motors that are heat sources therein. Thus, the tandem laser scan optical device increases the temperature by self-generating heat, and performs correction by detecting the temperature for each of the laser scan optical units. Accordingly, energy saving is not achieved.

Further, correction control is complex since the tandem laser scan optical device uses as many as four temperature sensors.

Concerning such aspects, as mentioned above, the print position difference occurs according to the characteristic of each of the laser scan optical units and the difference of temperature between the laser scan optical units. However, by arranging a plurality of scan optical systems close together, it does not matter if the temperature changes of the scan optical systems are regarded as the same. Thus, it is possible to manage with a smaller number of temperature sensors than the number of the laser scan optical units. Hence, the correction control can be simplified.

Moreover, in the prior art 3, a modulation means of the dot clock for performing printing correction is not specified. Thus, the prior art 3 lacks specifics for realization.

By the way, an image forming apparatus such as a laser printer, a laser facsimile, and a digital copying machine includes an optical writing device or an optical scan device having an optical deflector and a surface to be scanned. The optical deflector deflects (reflects) a beam from a light source. Information is written on the surface to be scanned by scanning the surface with the beam deflected by the optical deflector. Generally, a laser light source such as a semiconductor laser is used for the light source. Hereinafter, the optical scan device is referred to as a "laser scan device", and an optical system thereof is referred to as a "laser scan optical system".

As a factor that degrades writing quality or quality of forming images, there is variation in scan speed on the surface to be scanned, which surface is constituted by a surface of a photo conductor. When there is variation in the scan speed, as a result, shifts of dot positions (hereinafter referred to as "dot position shifts") occur. Especially, in color images, the variation in the scan speed causes color shift, resulting in degradation in color reproduction characteristics and resolution. Thus, in order to obtain high-quality images, one condition to be met is that the variation in the scan speed be eliminated. However, in prior art, there is a limit to eliminating the variation in the scan speed. The factors that cause the variation in the scan speed in the laser scan optical systems are as follows.

1. fθ characteristic of a scan lens is not sufficiently corrected 2. degradation in precision of optical components of the laser scan optical systems and accuracy in mounting to a housing 3. fθ characteristic is degraded due to variation in focal distance, which variation is caused by deformation of the optical components and variation in refraction factors of the optical components, according to variation in the environment such as temperature and moisture in an image forming apparatus In particular, it is possible to avoid the dot position shift in the main scan direction caused by the environmental variation (#3 of above factors), even if optical tuning or electrical correction is performed on the image forming apparatus before shipping. In order to meet the needs for higher quality these days, it is necessary to solve this problem. More specifically, in color image forming apparatuses such as color laser printers that scan with a light beam for each of a plurality of colors, the dot position shift in the main scan direction is a great factor for degrading image quality. Thus, it is important to eliminate the dot position shift so as to maintain image quality.

Prior art for correcting the dot position shift in the main scan direction are as follows. As an example of including a means for correcting a start position for writing of an image forming position of each color with an error within 1 clock, there is an invention described in Japanese Laid-Open Patent Application No. 2000-238319. As an example of adjusting the start position and end position for writing in the main scan direction, there is an invention described in Japanese Laid-Open Patent Application No 2000-289251.

However, in neither of the inventions described in the above-described applications, is it possible to correct the influence of the dot position shift in the main scan direction caused by optical systems and deflectors.

SUMMARY OF THE INVENTION

Accordingly, it is a general object of the present invention to provide an improved and useful image forming method, tandem laser scan optical device, optical scan device, and image forming apparatus using the optical scan device in which the above-mentioned problems are eliminated.

It is another and more specific object of the present invention to provide a tandem laser scan optical device that saves energy and corrects print position shift of main scan caused by variation in temperature and the like.

Hence, it is further object of the present invention to simplify correction control of print position shift by reducing the number of deflectors driven by rotating motors, the number of the deflectors being less than the number of media to be scanned so as to control self-generation of heat, and by detecting the temperature of a plurality of scan optical systems with a single temperature detecting element since the temperatures of physically close scan optical systems are almost equal.

It is a still further object of the present invention to provide an optical scan device that reduces the dot position shift in the main scan direction caused by environmental variation, and more particularly, generates little color shift (out-of-color registration) in a color image forming apparatus, and to provide an image forming apparatus using the optical scan device.

In order to achieve the above-mentioned objects, according to one aspect of the present invention, there is provided an image forming method using an image forming apparatus having an optical scan part scanning a plurality of media to be scanned, the image forming apparatus including: a plurality of light beam source parts corresponding to the plurality of media to be scanned, the light beam source parts each having a semiconductor laser as a light beam source; a deflector driven by a rotating motor, and deflecting each light beam emitted from the semiconductor lasers of the plurality of light beam source parts so as to scan the media, the number of the deflectors being less than the number of the media to be scanned; a plurality of scan optical systems corresponding to the plurality of media to be scanned, the scan optical systems forming an image-by the light beam; a temperature detecting elements detecting temperatures of the plurality of scan optical systems; and a scan light detector modulating the semiconductor laser based on an image modulation signal and detecting a scan beam light from the optical scan part at a predetermined position with respect to one of the media to be scanned, the image forming method including the steps of: (a) scanning the media to be scanned with a predetermined timing based on a detection signal from the scan beam light detector so as to form an electrostatic latent image according to the image modulation signal; and (b) forming an image by superposing the electrostatic latent images on the plurality of media to be scanned, wherein correction is made to displacement of scan positions of images on the plurality of media to be scanned by adjusting a phase of a pixel clock output to the semiconductor lasers of the plurality of light beam source parts based on temperature information detected by the temperature detecting element.

According to the above-mentioned aspect of the present invention, it is possible to simplify the control of correcting displacement of print positions, since only a small number of temperature sensors are required by detecting temperatures of a plurality of scan optical systems with a single temperature detecting element, considering that adjacent scan optical systems have almost the same temperature.

Also, less memory capacity is required. Further, since the number of polygon motors is also small, saving of energy is achieved.

In addition, according to another aspect of the present invention, there is provided an image forming method using an image forming apparatus having an optical scan part scanning a plurality of media to be scanned, the image forming apparatus including: a plurality of light beam source parts corresponding to the plurality of media to be scanned, the light beam source parts each having a semiconductor laser as a light beam source; a deflector driven by a rotating motor, and deflecting each light beam emitted from the semiconductor lasers of the plurality of light beam source parts so as to scan the media, the number of the deflectors being less than the number of the media to be scanned; a plurality of scan optical systems corresponding to the plurality of media to be scanned, the scan optical systems forming an image by the light beam; a plurality of temperature detecting elements detecting temperatures in the vicinities of the plurality of light beam source parts; and a scan light beam detector modulating the semiconductor laser based on an image modulation signal and detecting a scan light beam from the optical scan part at a predetermined position with respect to the one of the media to be scanned, the image forming method including the steps of: (a) scanning the media to be scanned with a predetermined timing based on a detection signal from the scan light beam detector so as to form an electrostatic latent image according to the image modulation signal; and (b) forming an image by superposing the electrostatic latent images on the plurality of media to be scanned, wherein correction is made to displacement of scan positions of images on the plurality of media to be scanned by adjusting a phase of a pixel clock output to the semiconductor lasers of the plurality of light beam source parts based on temperature information detected by the temperature detecting element.

According to the above-mentioned aspect of the present invention, it is possible to reduce variation in scan positions due to temperature change of the semiconductor lasers.

Further, according to another aspect of the present invention, there is provided an image forming method using an image forming apparatus having an optical scan part scanning a plurality of media to be scanned, the image forming apparatus including: a plurality of light beam source parts corresponding to the plurality of media to be scanned, the light beam source parts each having a semiconductor laser as a light source; a deflector driven by a rotating motor, and deflecting each light beam emitted from the semiconductor lasers of the plurality of light beam source parts so as to scan the media, the number of the deflectors being less than the number of the media to be scanned; a plurality of scan optical systems corresponding to the plurality of media to be scanned, the scan optical systems forming an image by the light beam; a temperature detecting element detecting temperature in the vicinity of the rotating motor of the deflector; and a scan light beam detector modulating the semiconductor laser based on an image modulation signal and detecting a scan light beam from the optical scan part at a predetermined position with respect to one of the media to be scanned, the image forming method including the steps of: (a) scanning the media to be scanned with a predetermined timing based on a detection signal from the scan light beam detector so as to form an electrostatic latent image according to the image modulation signal; and (b) forming an image by superposing the electrostatic latent images on the plurality of media to be scanned, wherein correction is made to displacement of scan positions of the electrostatic latent images on the plurality of media to be scanned by adjusting a phase of a pixel clock output to the semiconductor lasers of the plurality of light source parts based on temperature information detected by the temperature detecting element.

According to the above-mentioned aspect of the present invention, the temperature of the polygon part (deflector) represents the temperature of the whole writing unit. Thus, it is possible to simplify the control of correcting displacement of print positions.

Additionally, according to another aspect of the present invention, in the image forming method, the plurality of scan optical systems may be fθ optical systems changing constant angular velocity scan of the deflector to constant linear velocity scan.

According to the above-mentioned aspect of the present invention, the constant linear velocity fθ optical systems may be used. Hence, the phase adjusting amount of a pixel clock is decreased.

Furthermore, according to another aspect of the present invention, in the image forming method, at least one of the plurality of light beam source parts may include a semiconductor laser array emitting a plurality of the light beams.

According to the above-mentioned aspect of the present invention, the plurality of semiconductor laser light beams are emitted in accordance with each of the media to be scanned. Thus, it is possible to increase print quantity/print quantity. Moreover, noise-reducing and energy-saving image forming method is achieved, since it is not necessary to use high-speed rotating polygon motors.

In addition, according to another aspect of the present invention, in the image forming method, at least one of the plurality of light source parts may include a plurality of semiconductor lasers.

According to the above-mentioned aspect of the present invention, the plurality of semiconductor laser light beams are emitted in accordance with each of the media to be scanned. Thus, it is possible to increase print quantity/copy quantity. Moreover, a noise-reducing and energy-saving image forming method is achieved, since it is not necessary to use high-speed rotating polygon motors.

Further, according to another aspect of the present invention, in the image forming method, at least one of the plurality of light source parts may include a plurality of semiconductor laser arrays.

According to the above-mentioned aspect of the present invention, a plurality of semiconductor laser light beams are emitted in accordance with each of the media to be scanned. Thus, it is possible to increase print quantity/copy quantity. Moreover, a noise-reducing and energy-saving image forming method is achieved, since it is not necessary to use high-speed rotating polygon motors.

Additionally, according to another aspect of the present invention, in the image forming method, the difference of oscillation wavelength among semiconductor laser light beams in modulation may be within 10 nm.

According to the above-mentioned aspect of the present invention, it is possible to achieve a tandem laser scan optical system that causes little dot position shift and little variation in the diameter of dots that are produced due to wavelength variation within a single pulse.

In addition, according to another aspect of the present invention, in the image forming method, the wavelength variation between pulses of each semiconductor laser light beam in modulation may be within 2 nm.

According to the above-mentioned aspect of the present invention, it is possible to achieve a tandem laser scan optical system that causes little dot position shift and little variation in the diameter of a dot that is produced by wavelength variation within a single pulse.

Furthermore, according to another aspect of the present invention, in the image forming method, each of the scan optical systems may satisfy $|\Delta\lambda \times dH/d\lambda| < 5$ µm where $\Delta\lambda$ is a wavelength variation within a single pulse of the light beam, and $dH/d\lambda$ is a chromatic difference of magnification of each of the scan optical systems.

According to the above-mentioned aspect of the present invention, it is possible to achieve a tandem laser scan optical system that causes little dot position shift and little variation in the diameter of dots that are produced due to wavelength variation within a single pulse.

Also, according to another aspect of the present invention, there is provided an image forming apparatus, including: an optical scan part scanning a plurality of media to be scanned; a plurality of light beam source parts corresponding to the plurality of media to be scanned, the light beam source parts each having a semiconductor laser as a light beam source; a deflector driven by a rotating motor, and deflecting each light beam emitted from the semiconductor lasers of the plurality of light source parts so as to scan the media, the number of the deflectors is less than the number of the media to be scanned; a plurality of scan optical systems corresponding to the plurality of media to be scanned, the scan optical systems forming an image by the light beam; a plurality of temperature detecting elements detecting temperatures of the plurality of scan optical systems; and a scan beam light detector modulating the semiconductor laser based on an image modulation signal and detecting a scan light beam from the optical scan part at a predetermined position with respect to one of the media to be scanned, wherein the image forming apparatus uses an image forming method including the steps of: (a) scanning the media to be scanned with a predetermined timing based on a detection signal from the scan light beam detector so as to form an electrostatic latent image according to the image modulation signal; (b) forming an image by superposing images on the plurality of media to be scanned, wherein correction is made to displacement of scan positions of images on the plurality of media to be scanned by adjusting a of a pixel clock output to the semiconductor lasers of the plurality of light source parts based on temperature information detected by the temperature detecting elements.

According to the above-mentioned aspect of the present invention, it is possible to obtain an image forming apparatus that decreases jitter, roughness (graininess), and unevenness in density, and controls occurrence of color shift.

Also, according to another aspect of the present invention, there is provided an optical scan device having an optical deflector reflecting a light beam from a light beam source so as to deflect the light beam and having a surface to be scanned on which information is written such ,that the light beam deflected by the optical deflector scans the surface, the optical scan device including: optical detectors arranged at least in two locations, a start side of writing and an end side of writing, which locations are outside an effective writing area; a measuring part measuring a scan time required by the light beam deflected by the optical deflector to scan a range between the optical detectors; and a correcting part correcting each dot position of image data in the effective writing area to an arbitrary position based on a variation amount of the measured scan time.

According to the above-mentioned aspect of the present invention, it is possible not only to correct an initial dot position shift in the main scan direction remaining in an optical scan optical systems, but also to effectively correct a dot position shift in the main scan direction caused by change over time and the like. Thus, when the optical scan device is applied to an image forming apparatus, it is possible to obtain high-quality images having good color reproduction characteristic, high resolution, and no difference of image quality between the first print and a print after a plurality of prints.

In addition, according to another aspect of the present invention, the optical scan device may further includes a look-up table recording in advance the relationship between the scan time in the area between the optical detectors and a correction amount of the dot position, and in such an optical scan device, a phase shift amount of the dot position may be set based on a measured result of the scan time.

According to the above-mentioned aspect of the present invention, by using a look-up table, it is possible to estimate a dot position shift amount in the main scan direction in the effective writing (scan) area with at least two optical detectors. Thus, it is not necessary to provide a detector in the effective writing area. Therefore, a light path separation part for detecting a dot position shift in the main scan direction in the effective scan area and the like are not required. Consequently, it is possible to achieve detection of the dot position shift having advantage in cost and having no loss in an amount of light.

Further, according to another aspect of the present invention, in the optical scan device, the effective writing area may be divided into a plurality of image data areas, and a correction value may be set for each of the image data areas.

According to the above-mentioned aspect of the present invention, by giving phase data performing phase control of the pixel clock to each of the data area collecting the plurality of pixel clocks, in a case where phase data are stored in a memory beforehand and successively output, compared with a case where phase data are given to each pixel clock, it is possible to obtain the following effect: the data amount is drastically reduced, the size of a phase data storing circuit is reduced, cost reduction is achieved by decreasing a chip size, a smaller application specific IC (ASIC) is achieved, and so on.

Additionally, in high-speed operation where the pixel clock is approximately 100 MHz, by giving phase data of the pixel clock to each of the data areas, when correcting a variation of the phase shift amount caused by change of various conditions such as temperature change and time, for example, compared with a case where the phase data are given to each pixel clock, it is possible to perform control being less influenced by such as delay in data transfer speed.

Furthermore, according to another aspect of the present invention, in the optical scan device, the correction of the dot position may be performed by phase shifting a pixel clock based on a high-frequency clock having a higher frequency than that of the pixel clock.

According to the above-mentioned aspect of the present invention, it is possible to increase the control resolution of the correction of the dot position shift in the main scan direction. At the same time, it is possible to perform high-speed control.

Additionally, according to another aspect of the present invention, in the optical scan device, the light source may be a multi-beam light source constituted by a plurality of semiconductor lasers and a part optically combining laser beams from the plurality of semiconductor lasers, or by a monolithic semiconductor laser array.

According to the above-mentioned aspect of the present invention, by applying the optical scan device to a multi-beam optical system, even when applied to a high-speed image forming apparatus and the like, it is possible to achieve an optical scan device in which a dot position shift in the main scan direction is small.

Moreover, since there is no exposure shift caused by the difference of oscillation wavelengths between light sources, it is possible to correct a dot position shift in the main scan direction caused by the difference of oscillation wavelength between the light sources.

In addition, according to another aspect of the present invention, there is provided an optical scan device having an optical deflector reflecting a light beam from a light beam source so as to deflect the light beam and having a surface to be scanned on which information is written such that the light beam deflected by the deflector scans the surface, the optical scan device including: a temperature sensor; a look-up table recording in advance the relationship between temperature change detected by the temperature sensor and a phase shift; and a correcting part correcting each dot position of image data in an effective writing area to an arbitrary position based on the temperature change.

According to the above-mentioned aspect of the present invention, there is an advantage in that it is possible to simplify a detection circuit structure since, instead of the part measuring the scan time between the optical detectors as described above, the temperature sensor is used for correcting each dot position shift of image data.

Further, according to another aspect of the present invention, there is provided an image forming apparatus, including: an optical scan device including: an optical deflector reflecting a light beam from a light beam source so as to deflect the light beam; a surface to be scanned on which information is written such that the light beam deflected by the deflector scans the surface; optical detectors arranged at least in two locations, a start side of writing and an end side of writing, which locations are outside an effective writing area; a measuring part measuring a scan time required by the light beam deflected by the optical deflector to scan a range between the optical detectors; and a correcting part correcting each dot position of image data in the effective writing area to an arbitrary position based on a variation amount of the measured scan time, wherein an electrostatic latent image is formed on the surface to be scanned, developed and transferred onto a sheet of transfer paper by using the optical scan device.

Also, according to another aspect of the present invention, there is provided an image forming apparatus, including: an optical scan device including: an optical deflector reflecting a light beam from a light beam source so as to deflect the light beam; a surface to be scanned on which information is written such that the light beam deflected by the deflector scans the surface; a temperature sensor; a look-up table recording in advance the relationship between temperature change detected by the temperature sensor and a phase shift; and a correcting part correcting each dot position of image data in an effective writing area to an arbitrary position based on the temperature change, wherein an electrostatic latent image is formed on the surface to be scanned, developed and transferred onto a sheet of transfer paper by using the optical scan device.

Other objects, features and advantages of the present invention will become more apparent from the following detailed description when read in conjunction with the following drawings.

BRIEF DESCRIPTION OF THE DRAWINGS

FIG. 31A is a graph showing the dot position shift in the main scan direction in an initial state of a laser scan optical system;

FIG. 31B is a graph showing the dot position shift in the main scan direction in an initial state of another laser scan optical system;

FIG. 31C is a graph showing the dot position shift in the main scan direction when the frequency of a pixel clock is shifted to a lower frequency;

FIG. 31D is a graph showing the dot position shift in the main scan direction when the frequency of a pixel clock is shifted to a higher frequency;

FIG. 31E is a graph showing the dot position shift in the main scan direction when the average value of the dot position shift amount after phase shift is set to 0 in the laser scan optical system;

FIG. 31F is a graph showing the dot position shift in the main scan direction when the average value of the dot position shift amount after phase shift is set to 0 in another laser scan optical system.

DETAILED DESCRIPTION OF THE PREFERRED EMBODIMENTS

A description will be given of embodiments of the present invention, with reference to FIGS. 1 through 19B, in the order of: the configuration of a device that detects temperature, a pixel clock phasing method based on the configuration of the device, the configuration of a multi-beam light source, the configuration and operation process of a scan optical system, and conditions under which the present invention are effectively applied.

First, a description will be given of the configuration of the device that detects temperature according to the embodiments.

Figure 1:
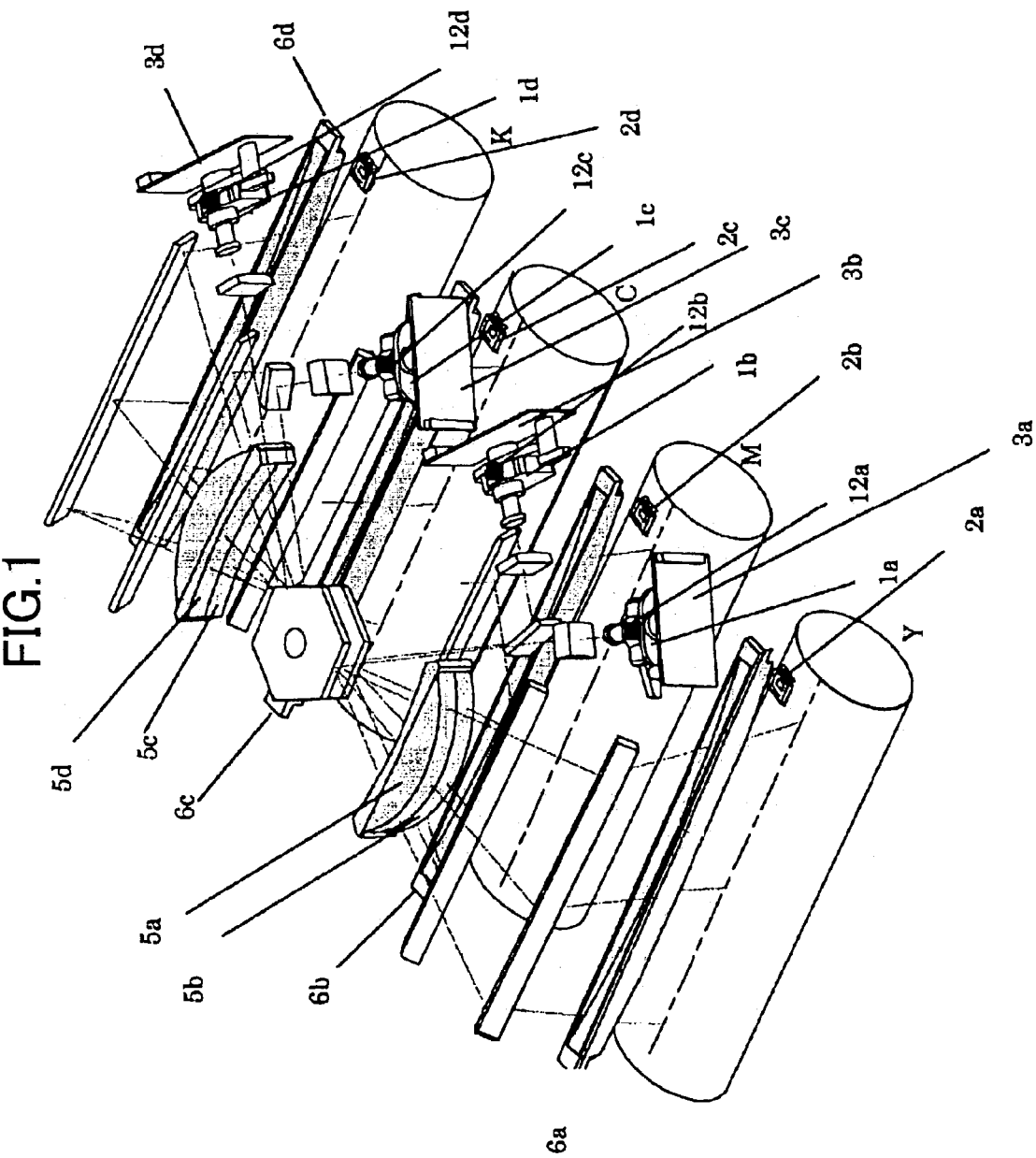
FIG. 1 is an outline view of a tandem laser scan optical unit according to the present invention.
Figure 2:
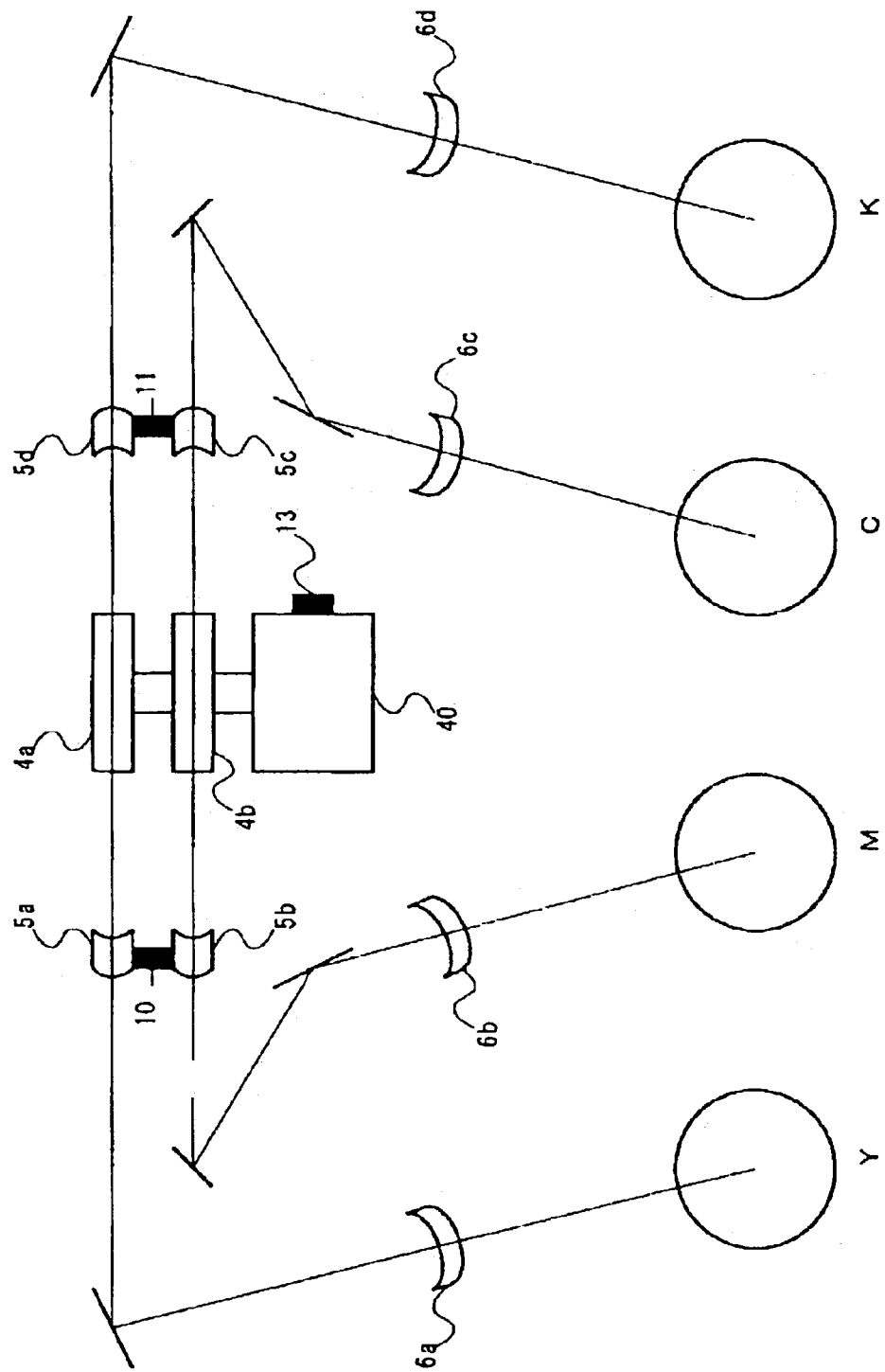
FIG. 2 is a side view of the tandem laser scan optical unit of FIG. 1.

FIG. 1 is an outline view and FIG. 2 is a side view of a tandem laser scan optical unit. The tandem laser scan optical unit includes four scan optical systems "5a, 6a", "5b, 6b", "5c, 6c" and "5d, 6d" corresponding to four colors: Y, M, C and K, a plurality of light beam sources 1a, 1b, 1c and 1d, a rotating motor 40, polygon mirrors 4a and 4b, scanning light beam detectors 2a, 2b, 2c and 2d, and phase adjusters of a pixel clock 3a, 3b, 3c and 3d.

Additionally, in the embodiments, the tandem laser scan optical unit includes temperature detecting elements 10 and 11. Each of the temperature detecting elements 10 and 11 detects temperatures of two scan optical systems.

Further, in the embodiments, the tandem laser scan optical unit includes temperature detecting elements 12a, 12b, 12c and 12d that detect temperatures of the plurality of light beam sources.

Figure 3:
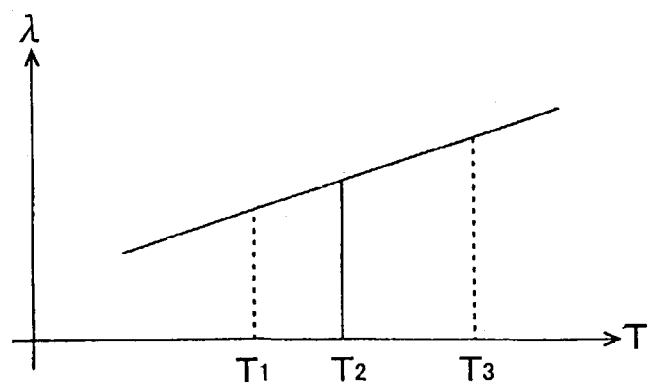
FIG. 3 is a graph showing shifts of the wavelength of a laser used by a semiconductor laser with respect to the temperature of a scan optical system.
Figure 4:
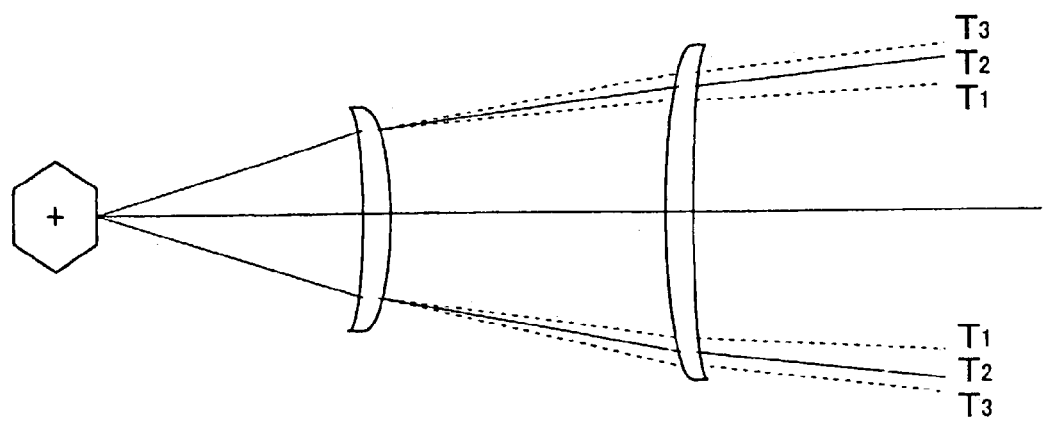
FIG. 4 is a schematic diagram showing variations in scan position according to chromatic aberration with temperature change.

As shown in FIG. 3, the wavelength of a semiconductor laser is shifted to the long wavelength side when the temperature increases. Thus, a refraction factor of the scan optical system varies at temperatures $T_1$ and $T_3$ at which the temperature drops/rises compared with a temperature $T_2$ in design, respectively. Therefore, as shown in FIG. 4, a scan position varies depending on chromatic aberrant of the scan optical system. In the present invention, the phase adjuster of the pixel clock corrects the variation in the scan position according to the temperature change of the semiconductor laser.

Additionally, in the embodiments, the tandem laser scan optical unit includes a temperature detecting element 13 that detects the temperature of the polygon rotating motor 40. In the tandem laser scan optical unit, the polygon rotating motor 40 is the source of heat. By detecting the temperature of the polygon rotating motor 40, it is possible to assume the detected temperature as the temperature of the scan optical unit including the scan optical systems.

Figure 5:
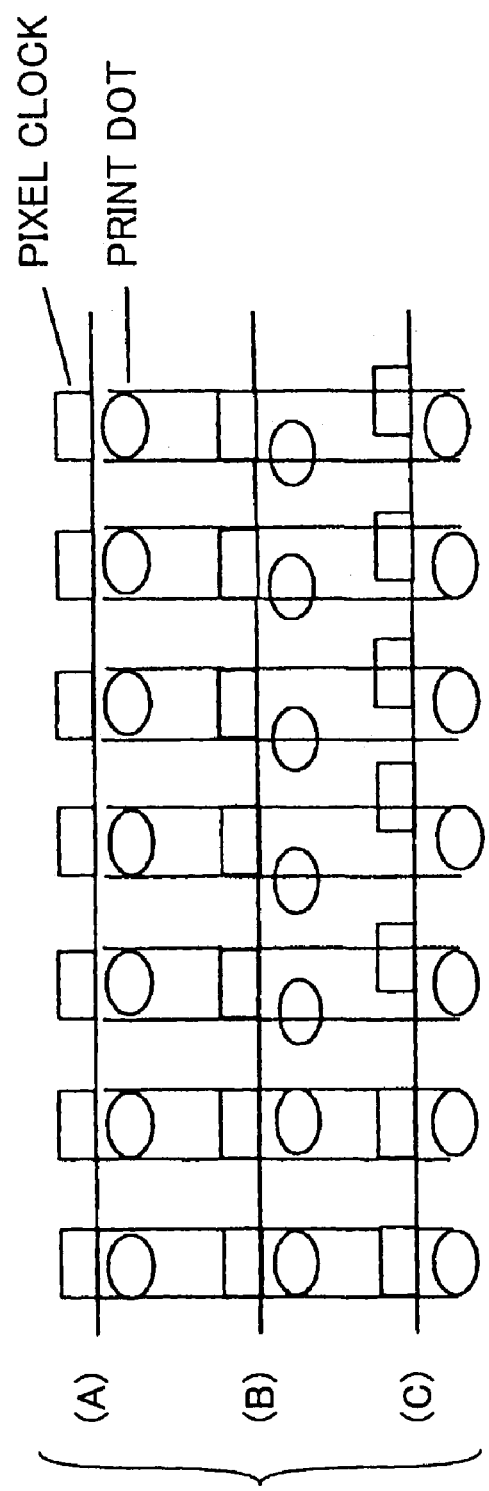
FIG. 5 is a schematic diagram for explaining the major point of the present invention.

When the print position is shifted, such as when the print positions of dots indicated by (A) in FIG. 5 are shifted to those of dots indicated by (B) in FIG. 5, due to errors in mounting the scan optical systems and bent mirrors, and to the temperature change in the scan optical systems and the bent mirrors, it is possible to return the positions of dots to the original target positions by adjusting the phase of the pixel clock as indicated by (C) in FIG. 5 based on temperature data of the temperature detecting means.

Next, in first to third embodiments, a detailed description will be given of the pixel clock phasing method for correcting the shifted dot position.

First Embodiment

Figure 6:
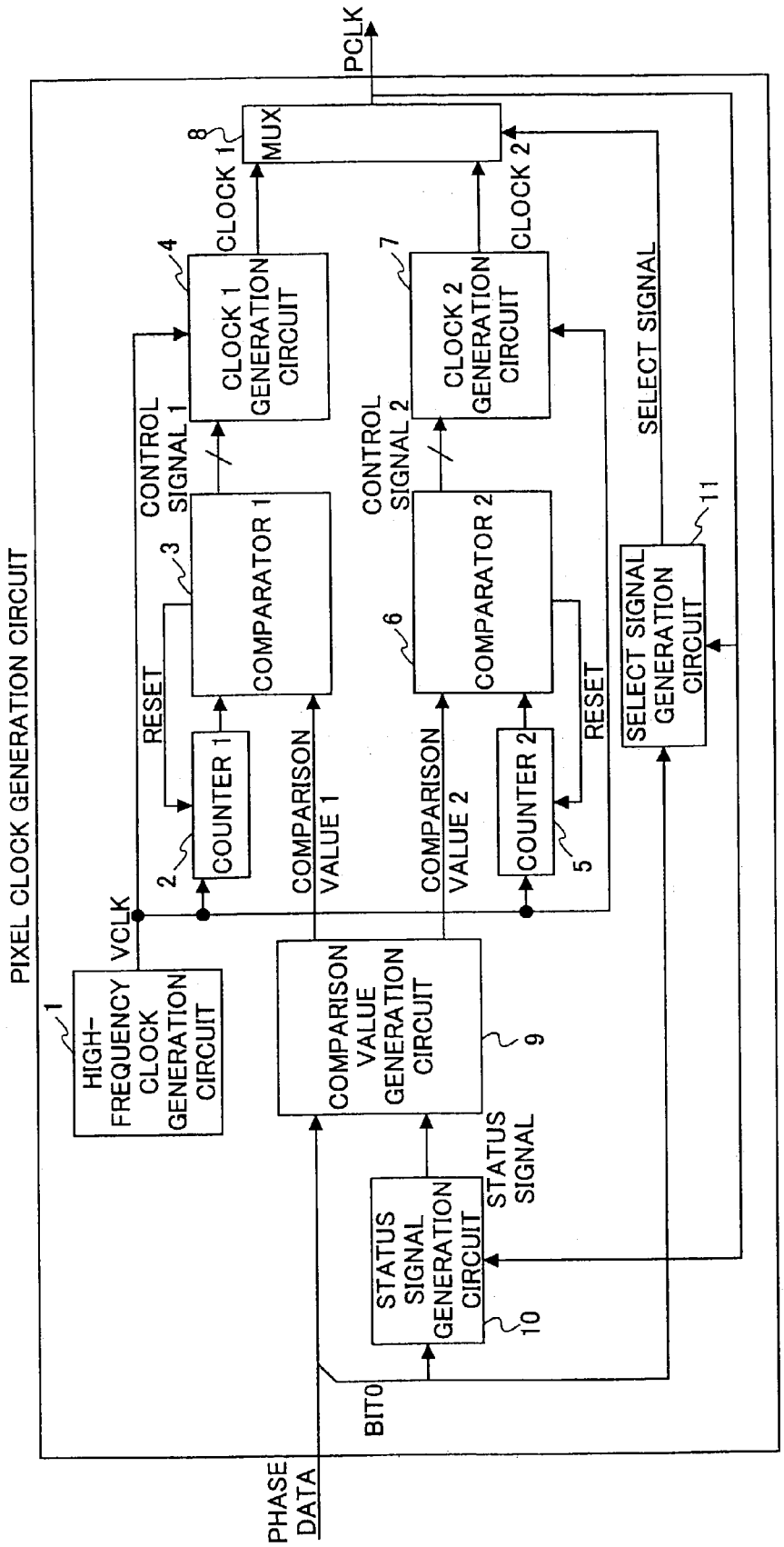
FIG. 6 is a block diagram showing a phase adjusting method of a pixel clock according to a first embodiment.

FIG. 6 shows the configuration of the pixel clock phase adjusters (3a through 3d in FIG. 1). In FIG. 6, a high frequency clock generation circuit 1 generates a high frequency clock VCLK that is the basis of the pixel clock PCLK. A counter 1 (2) is a counter that operates when the clock VCLK rises. A comparator 1 (3) outputs a control signal 1 based on a result of comparison among a value of the counter 1 (2), a predetermined value, and a comparison value 1 output by a comparison value generation circuit 9. A clock 1 generation circuit 4 generates a clock 1 based on the control signal 1. A counter 2 (5) is a counter that operates when the clock VCLK falls. A comparator 2 (6) outputs a control signal 2 based on a result of comparison among a value of the counter 2 (5), a predetermined value, and a comparison value 2 output by the comparison value generation circuit 9. A clock 2 generation circuit 7 generates a clock 2 based on the control signal 2. A multiplexer (MUX) 8 selects and outputs, as a PCLK, either the clock 1 or the clock 2 based on a select signal. The comparison value generation circuit 9 outputs the comparison values 1 and 2 based on externally input phase data and a status signal output by a status signal generation circuit 10. The status signal generation circuit 10 toggles a signal in timing of the rise of the PCLK when bit0 of the phase data is 1, and outputs the signal as the status signal. A select signal generation circuit 11 toggles a signal in timing of the fall of the PCLK when bit0 of the phase data is 1, and outputs the signal as the select signal.

Figure 7:
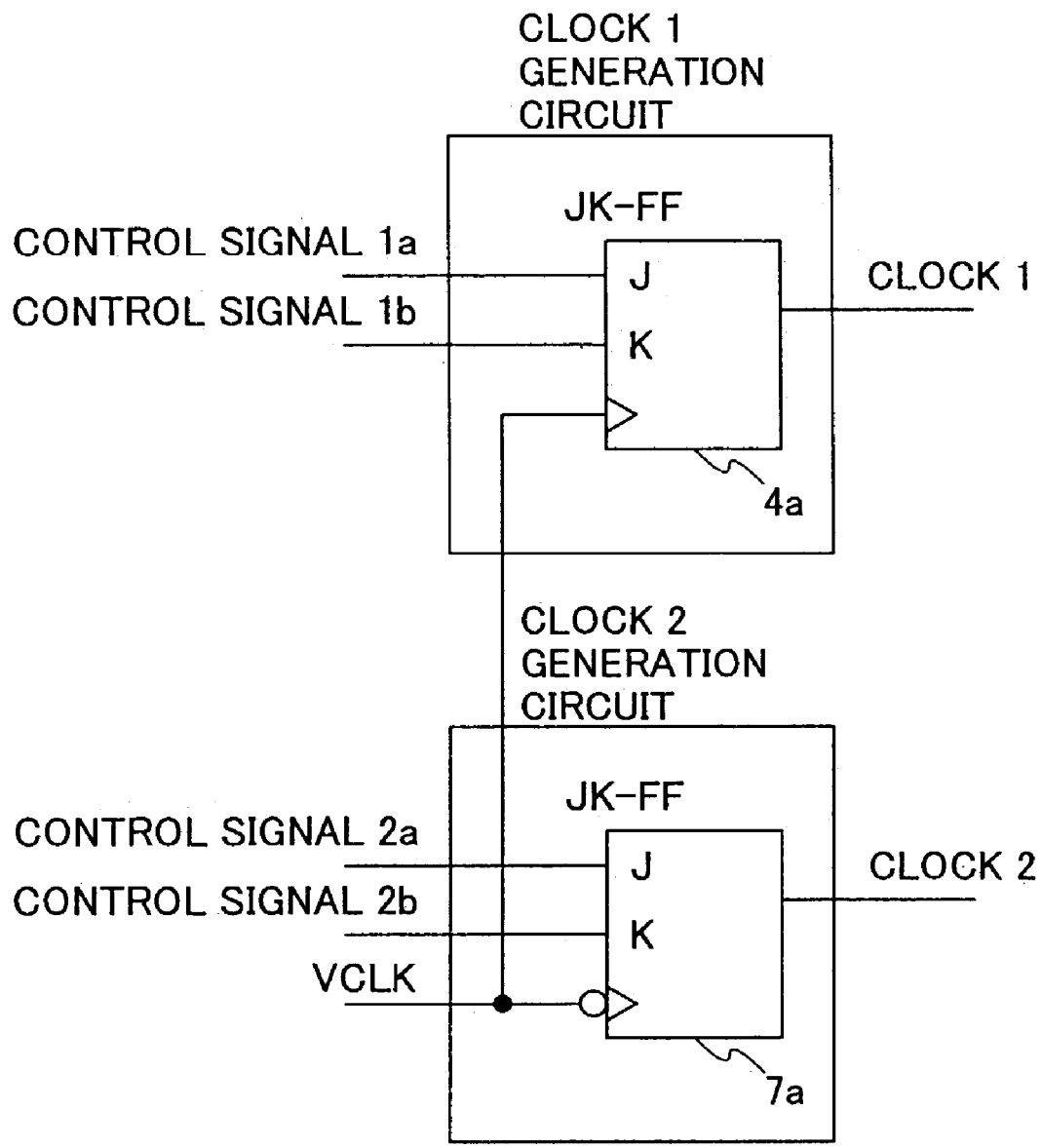
FIG. 7 is a block diagram showing an example of the clock 1 generation circuit 4 and the clock 2 generation circuit 7 of FIG. 6.
Figure 8:
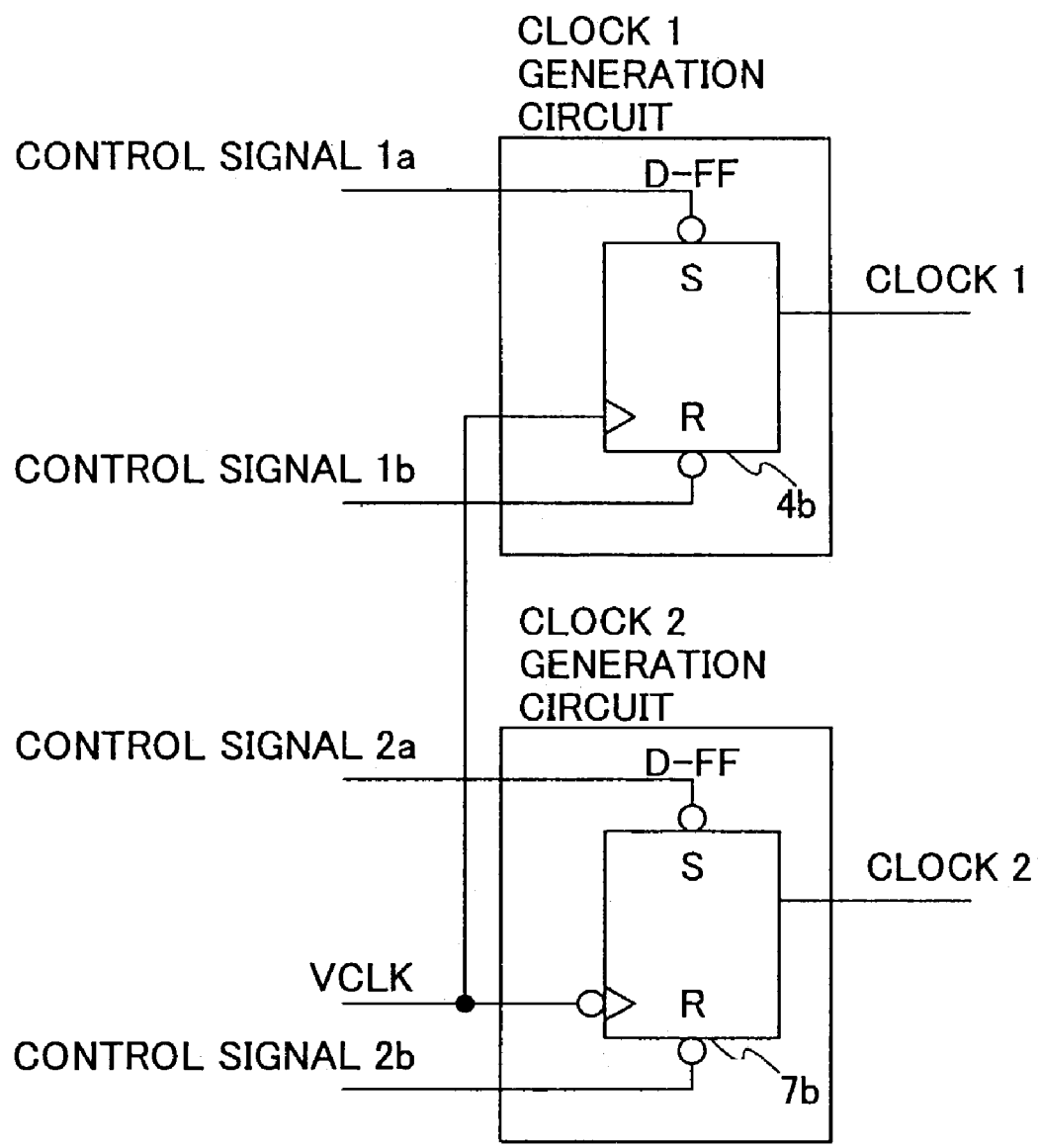
FIG. 8 is a block diagram showing another example of the clock 1 generation circuit 4 and the clock 2 generation circuit 7 of FIG. 6.

FIGS. 7 and 8 show examples of the configurations of the clock 1 generation circuit 4 and the clock 2 generation circuit 7 in FIG. 6. In FIG. 7, each of the clock 1 generation circuit 4 and the clock 2 generation circuit 7 is constituted by a JK-FF. A JK-FF 4a operates at the rise of the VCLK, and a JK-FF 7a operates at the fall of the VCLK. In FIG. 8, each of the clock 1 generation circuit 4 and the clock 2 generation circuit 7 is constituted by a D-FF with clock synchronization set/reset. A D-FF 4b operates at the rise of the VCLK, and a D-FF 7b operates at the fall of the VCLK.

A description will be given of the operations in FIGS. 6, 7 and 8, by using FIGS. 9 and 10. Here, a case is assumed where the pixel clock PCLK corresponding to four cycles of the VCLK is generated, and the VCLK is shifted for +⅛ PCLK and −⅛ PCLK as phase shifts. Table 1 shows the relationship between an amount of phase shift and the externally given phase data.

TABLE 1

| amount of phase shift | phase data |
| --- | --- |
| 0 | 00 |
| +1/8 PCLK | 01 |
| −1/8 PCLK | 11 |

Figure 9:
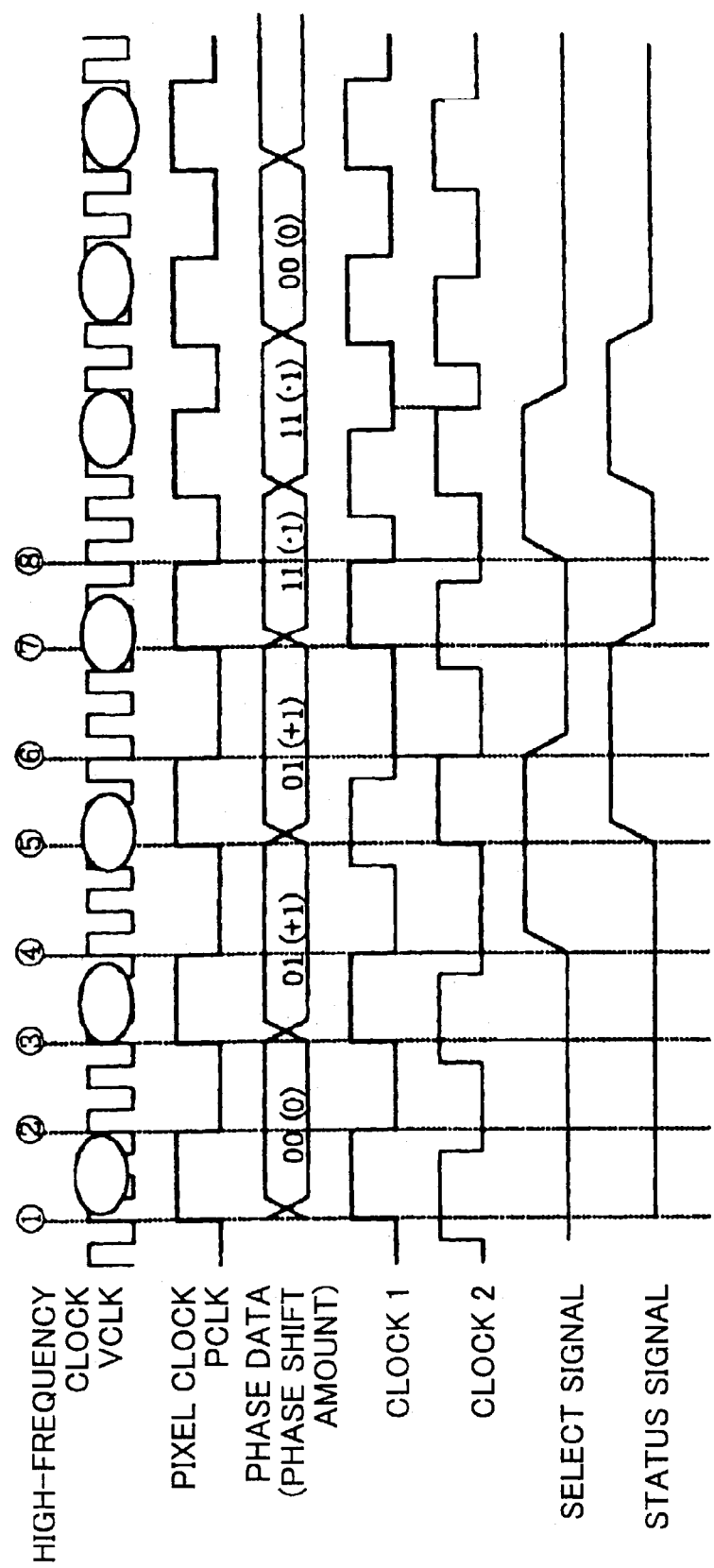
FIG. 9 is a waveform chart for explaining switching between clocks 1 and 2 according to the first embodiment.
Figure 10:
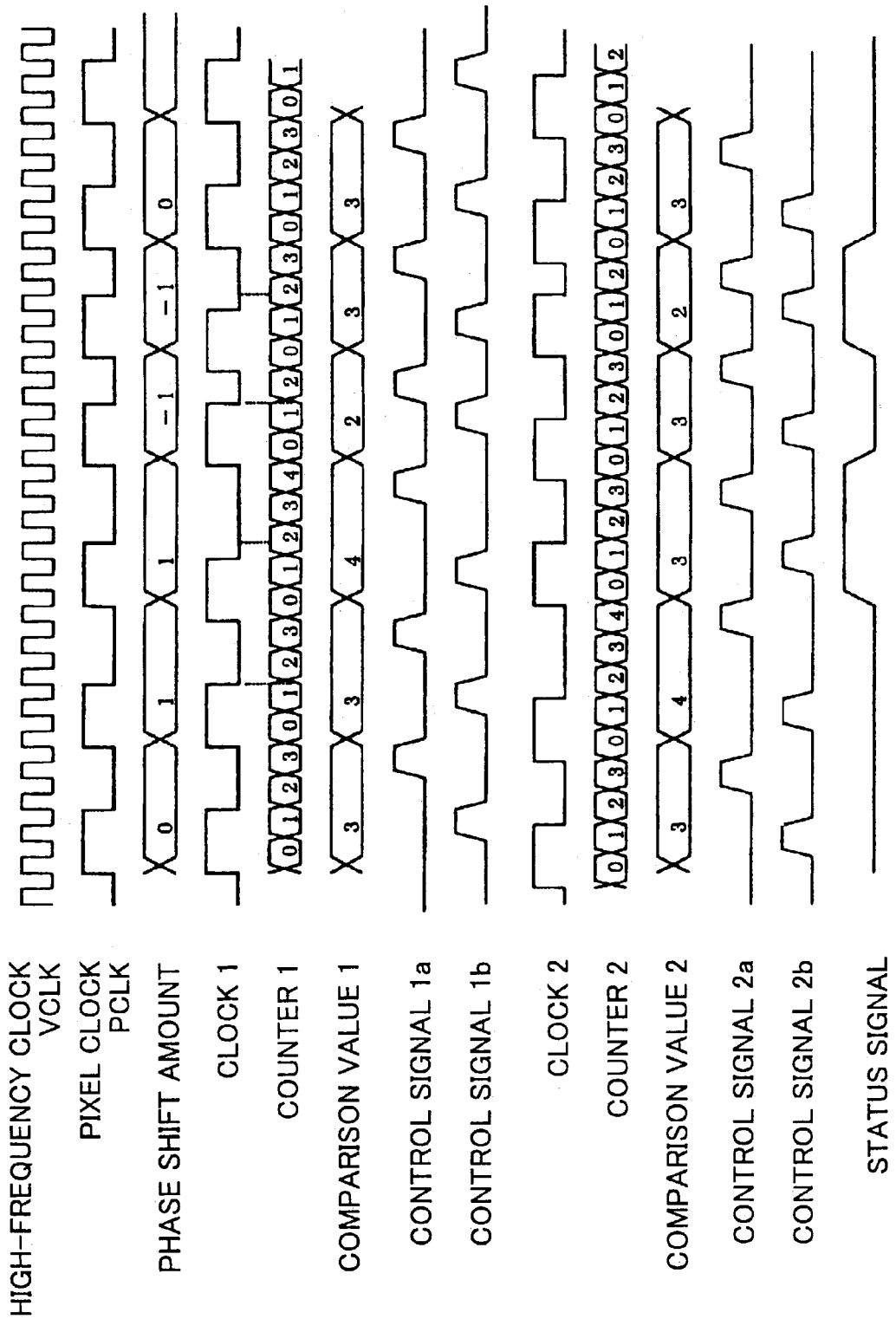
FIG. 10 is a wave form chart for explaining generation of the clocks 1 and 2 according to the first embodiment.

FIG. 9 shows the amount of phase shift, and switching between the clocks 1 and 2. The generation of the clocks 1 and 2 will be described later, with reference to FIG. 10.

First, starting from a state where the multiplexer 8 selects the clock 1, the phase data 00 is given in synchronization with the PCLK (①). Since the phase data bit0 is 0, the select signal remains 0, and the clock 1 remains selected and is output as PCLK (②) Hence, the PCLK assumes a clock of which amount of phase shift is 0.

Next, 01 is given as the phase data (③). In this case, since the phase data bit0 is 1, the select signal is toggled to 1 at the fall of PCLK, so that the clock 2 is selected, then, the clock 2 is output as PCLK (④). The clock 2 then assumes, as shown in FIG. 9, a clock having a longer cycle for 1 VCLK. Hence, PCLK of which phase is shifted for +⅛ PCLK is obtained. Next, when 01 is given again as the phase data (⑤), since the phase data bit0 is 1, the select signal is toggled to 0 at the fall of PCLK so that the clock 1 is selected, then, the clock 1 is output as PCLK (⑥). The clock 1 then assumes, as shown in FIG. 9, a clock having a longer cycle for 1 VCLK. Hence, PCLK of which phase is shifted for +⅛ PCLK is obtained.

Next, 11 is given as the phase data (⑦). Since the phase data bit0 is 1, the select signal is toggled to 1 at the fall of the PCLK so that the clock 2 is selected, then, the clock 2 is output as PCLK (⑧) The clock 1 then assumes, as shown in FIG. 9, a clock having a shorter cycle for 1 VCLK. Hence, PCLK of which phase is shifted for −⅛ PCLK is obtained.

As described above, by varying the cycles of the clocks 1 and 2 according to the phase data, and switching between the clocks 1 and 2 so as to output as PCLK, it is possible to obtain the pixel clock PCLK of which phase is shifted by ⅛ PCLK step.

Next, by referring to FIG. 10, a description will be given of the generation of the clocks 1 and 2.

To begin with, a description will be given of the generation of the clock 1.

The counter 1 (2) in FIG. 6 is counted by the rise of VCLK. The comparator 1 (3) of FIG. 6 outputs a control signal 1b when the value of the counter 1 is 1. The control signal 1b is given to K of the JK-FF 4a in FIG. 7 and causes transition of the clock 1 from 1 to 0. When the value of the counter 1 (2) matches the comparison value 1 output by the comparison value generation circuit 9 in FIG. 6, the comparator 1 (3) outputs a control signal 1a. The control signal 1a is given to J of the JK-FF 4a in FIG. 2, and causes transition of the clock 1 from 0 to 1.

In this manner, it is possible to make the cycle of the clock 1 long or short according to the value of the comparison value 1.

The value of the comparison value 1 is output after being converted, by the comparison value generation circuit 9, as shown in Table 2 based on the phase data and the status signal. The status signal is obtained by toggling at the rise of PCLK when bit0 of the phase data is 1, and represents whether PCLK starts from the rise or the fall of VCLK.

TABLE 2

| phase data | status | comparison value 1 | comparison value 2 |
| --- | --- | --- | --- |
| 00 | 0 | 3 | 3 |
| 00 | 1 | 3 | 3 |
| 01 | 0 | 3 | 4 |
| 01 | 1 | 4 | 3 |
| 11 | 0 | 2 | 3 |
| 11 | 1 | 3 | 2 |

A description will be given of the generation of the clock 2.

The counter 2 (5) in FIG. 6 is counted at the fall of VCLK. The comparator 2 (6) in FIG. 6 outputs a control signal 2b when the value of the counter 2 is 1 control signal 2b is given to K of the JK-FF 7a in FIG. 7, and causes the transition of the clock 2 from 1 to 0. The comparator 2 (6) outputs a control signal 2a when the value of the counter 2 matches the comparison value 2 output by the comparison value generation circuit 9 in FIG. 6. The control signal 2a is given to J of the JK-FF 7a in FIG. 7, and causes transition of the clock 1 from 0 to 1.

In this manner, it is possible to make the cycle of the clock 2 long or short according to the value of the comparison value 2.

The value of the comparison value 2 is output after being converted, by the comparison value generation circuit 9, as shown in Table 2 based on the phase data and the status signal.

It is also possible to obtain clocks 1 and 2 as described above by reversing the polarities of the control signals 1a and 1b and those of the control signals 2a and 2b, and thereafter giving the control signals to the D-FFs with synchronization set/reset 4b and 7b in FIG. 8, respectively.

In addition, when a clock obtained by reversing VCLK is given to the counter 2 (5) and the clock 2 generation circuit 7, it is possible to constitute the counter 2 (5) and the clock 2 generation circuit 7 by the same components of the counter 1 (2) and the clock 1 generation circuit 4, respectively. Thus, the cost can be reduced.

Second Embodiment

A description will be given of the second embodiment.

Figure 11:
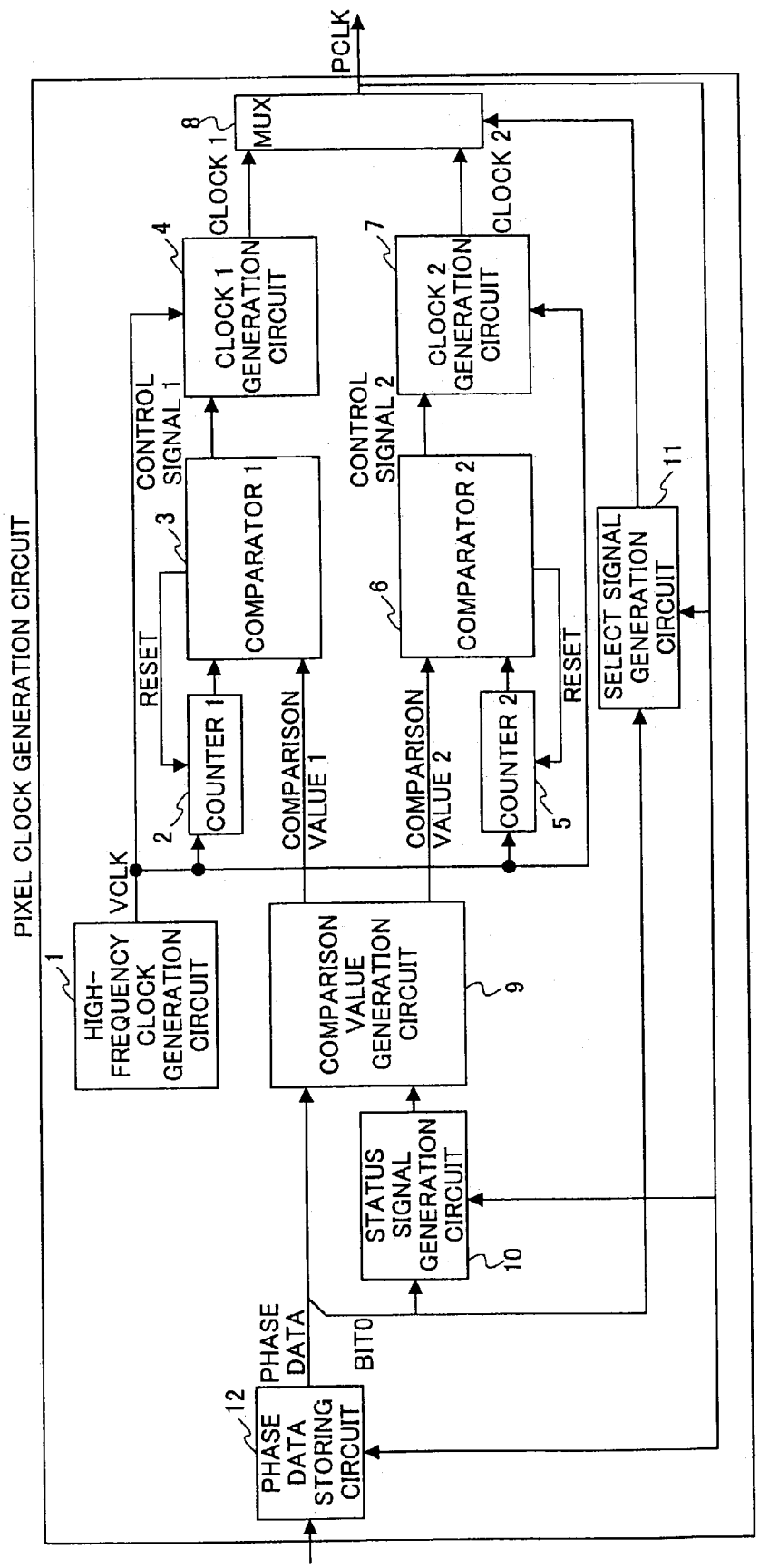
FIG. 11 is a block diagram showing a phase adjusting method of the pixel clock according to a second embodiment.

FIG. 11 shows the configuration of the pixel clock generation circuit according to the second embodiment. In the second embodiment, a phase data storing circuit 12 for storing a plurality of phase data is added to the configuration according to the first embodiment. Data of the phase data storing circuit 12 are set externally. The phase data storing circuit 12 sequentially outputs phase data in synchronization with the pixel clock PCLK.

In this manner, for example, in a case of data having the same phase data for each line, such as phase data for correcting unevenness in scanning caused by the characteristics of scan lens, by storing the phase data in the phase data storing circuit 12 beforehand, and sequentially outputting the phase data from the phase data storing circuit 12 every time a line is scanned, it is not necessary to input the same data to the phase data storing circuit 12 from the outside. Accordingly, the load of an external circuit can be reduced.

Third Embodiment

A description will be given of the third embodiment.

Figure 12:
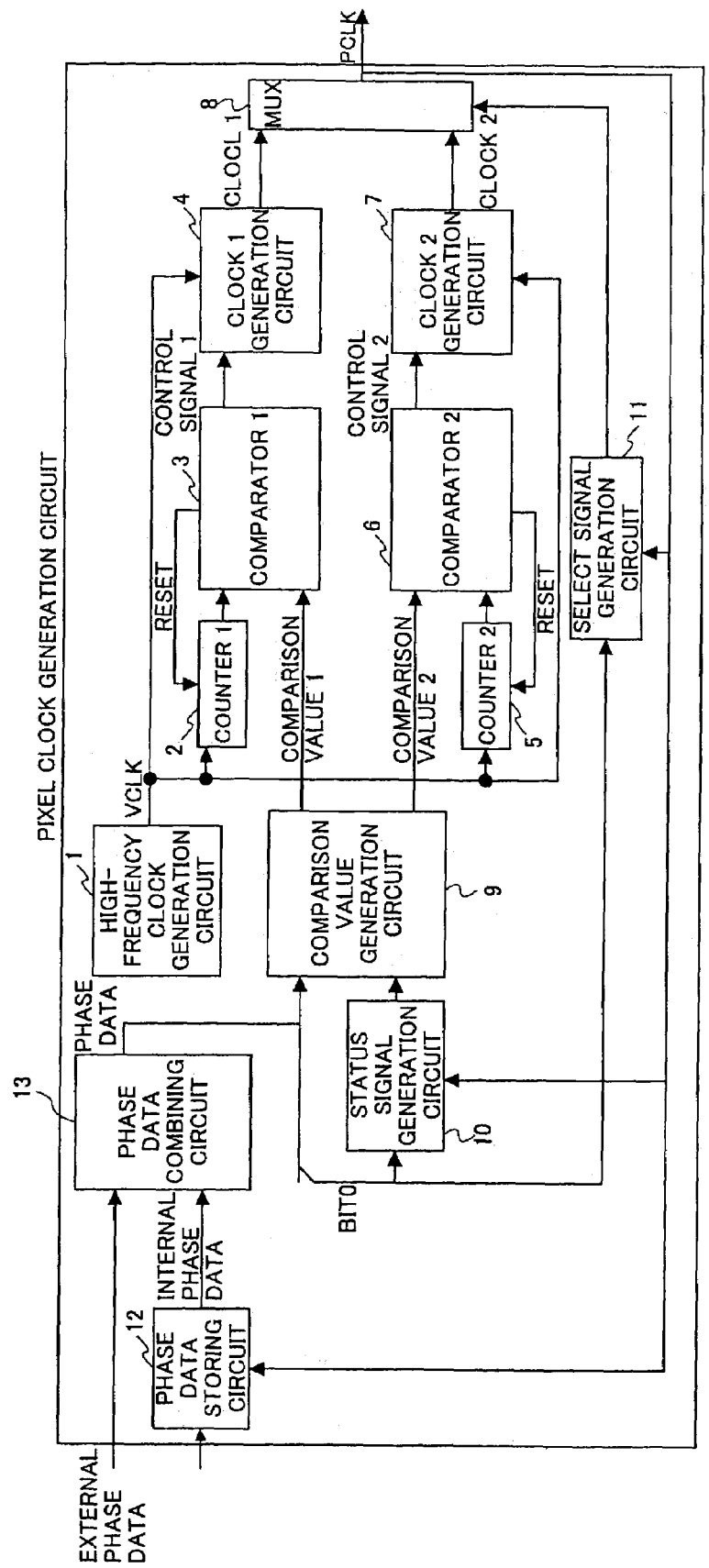
FIG. 12 is a block diagram showing a phase adjusting method of the pixel clock according to a third embodiment.

FIG. 12 shows the configuration according to the third embodiment. In the third embodiment, a phase data combining circuit 13 is added to the configuration according to the second embodiment. The phase data combining circuit 13 combines and outputs, to the comparison value generation circuit 9, external phase data given from the outside and internal phase data output from the phase data storing circuit 12. The phase data combining circuit 13 performs the calculation as shown below and outputs the phase data.

$$\text{phase data} = \text{external phase data} + \text{internal phase data}$$

Hence, it is possible not only to perform the same correction for every line, such as correcting unevenness in scanning caused by the characteristics of scan lens, but to perform a correction that varies in every line, such as correcting unevenness of the rotation of the polygon mirror.

Next, a description will be given of a light beam source used in this embodiment.

Figure 13:
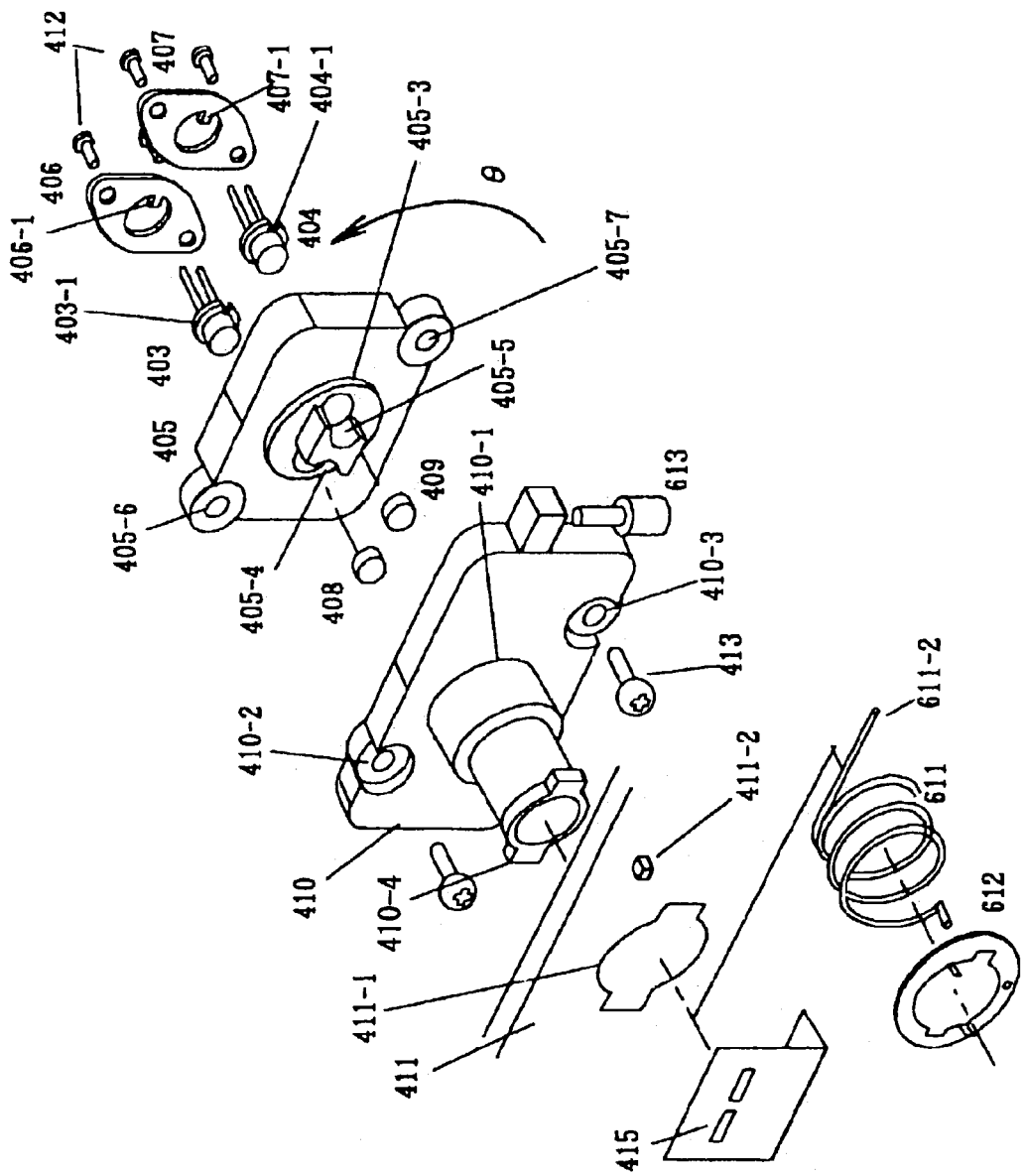
FIG. 13 is an exploded perspective view of a multi-beam light source of semiconductor lasers according to the present invention.

FIG. 13 is an exploded perspective view of a multi-beam light source according to an embodiment of the pixel clock phasing method.

In a first embodiment of the light beam source, two semiconductor lasers are used and arranged in a sub scan direction so that the semiconductor lasers are symmetrical with respect to an optical axis of a collimate lens.

The semiconductor lasers are laid out such that their optical axes match the optical axis of the collimate lens, the semiconductor lasers have radiation angles symmetrical with respect to a main scan direction, and the radiation axes cross at a reflecting point of a polygon mirror.

A plurality of light beams radiated from each of the semiconductor lasers are scanned together by the polygon mirror via a cylinder lens, and an image is formed on a photo conductor by a fθ lens and a toroidal lens.

A buffer memory stores print data for one line for each of luminous sources. The print data are read at each surface of the polygon mirror, and recorded by two lines at a time.

The semiconductor lasers 403 and 404 fit respective cylindrical heat sink parts 403-1 and 404-1 to fitting holes 405-1 and 405-2 (not shown), respectively, which are formed on the backside of a base member 405 that is slightly inclined by a predetermined angle (approximately 15° in this embodiment) in the main scan direction. Projections 406-1 and 407-1 of press members 406 and 407, respectively, are engaged with the notches of the heat sink parts 403-1 and 404-1 so as to align the arranging directions of the luminous sources, and are fixed by screws 412 from the backside.

In addition, the collimate lenses 408 and 409 fit their peripheries to semicylindrical mounting guide surfaces 405-4 and 405-5, respectively, so as to perform adjustment in the optical axis direction. Then, the collimate lenses 408 and 409 are positioned and adhered so that diverging beams radiated from luminescence points become parallel light flux. It should be noted that, in this embodiment, since light from the semiconductor lasers 403 and 404 are set so as to be crosswise in a main scan surface as mentioned above, the fitting holes 405-1 and 405-2 and the semicylindrical mounting guide surfaces 405-4 and 405-5 are formed to be inclined along the light path.

The base member 405 engages its cylindrical engaging part 405-3 to a holder member 410. Screws 413 are screwed and fixed to screw holes 405-6 and 405-7 via through-holes 410-2 and 410-3, respectively, so as to constitute a light source unit.

The above-described light source unit is constituted by fitting a cylindrical part 410-1 of the holder member 410 to a tooling hole 411-1 provided to a mounting wall 411 of an optical housing (not shown), and engaging a stopper member 612 to a cylindrical projection 410-4 by inserting a spring 611 from the front side so that the holder member 410 is held on the backside of the mounting wall 411. At this moment, by hooking one end of the spring 611 to a projection 411-2 so as to generate a turning force having the center of the cylindrical part 410-1 as an axis of rotation, the whole unit is rotated around the optical axis in the direction indicated by θ so as to adjust the pitch by using an adjustment screw 613, which is provided so as to lock the turning force. An aperture 415 provides a slit for each semiconductor laser. The aperture 415 is attached to the optical housing so as to define the exit diameter of the optical beam.

Figures 14A, 14B:
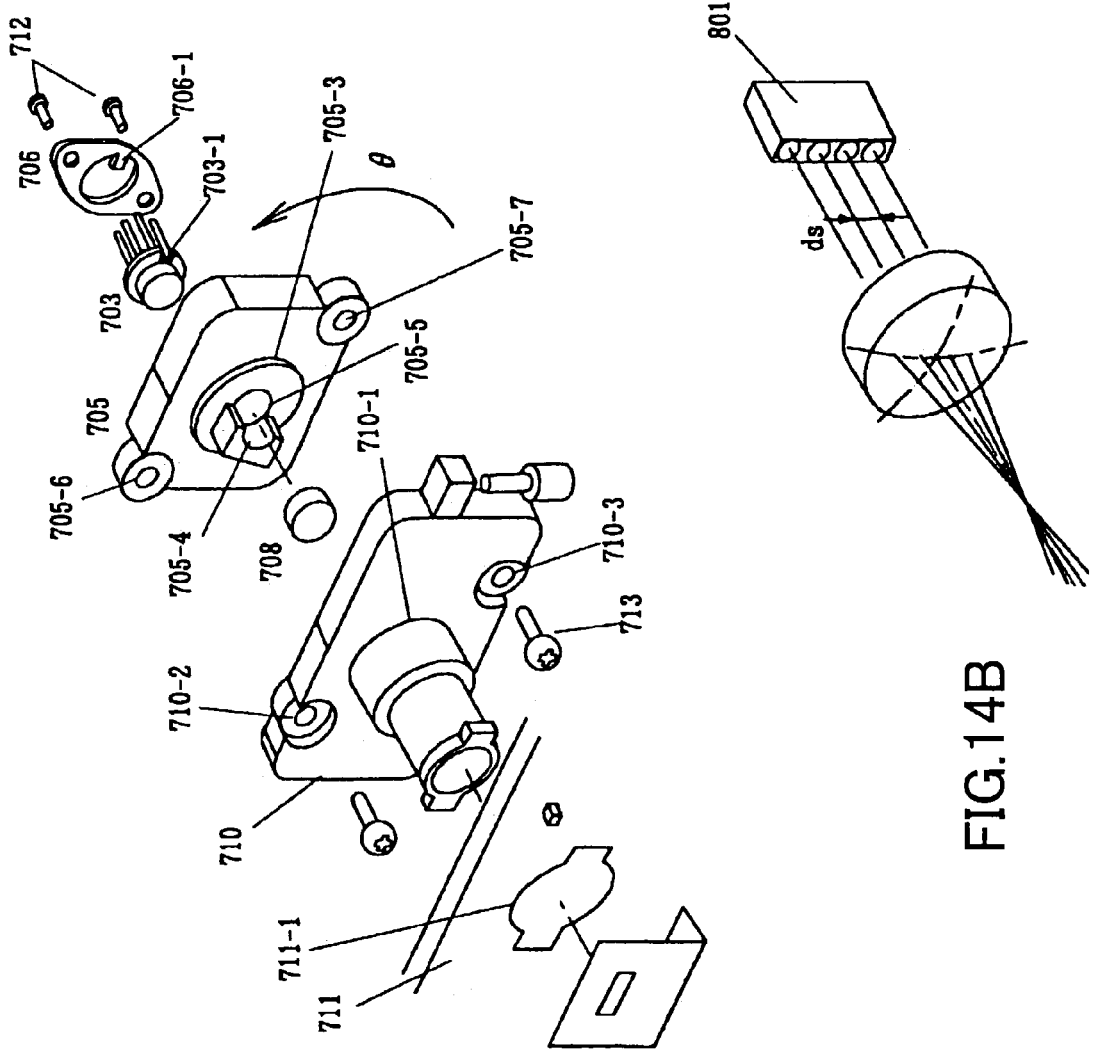
FIG. 14A is an exploded perspective view of a light beam source of semiconductor lasers having a semiconductor laser array.
FIG. 14B is a perspective view showing a monolithic semiconductor laser array and a collimate lens in detail.

FIGS. 14A and 14B show a second embodiment of the light source. In FIGS. 14A and 14B, an example is shown where a beam combining means combines optical beams from a semiconductor laser array having four light sources. The basic components are similar to those of the first embodiment, and a description thereof will be omitted.

Also, it is possible to further increase the number of beams by substituting each of the semiconductor lasers 403 and 404 in FIG. 13 with a semiconductor laser array shown in FIGS. 14A and 14B.

In addition, the four scan optical systems may be fθ optical systems or non-fθ optical systems.

In a case of the non-fθ optical systems, the image data may be converted by the above-described adjusting means (phase adjuster) of the pixel clock so that the image data possess fθ characteristic on a surface to be scanned.

Next, a description will be given of the configuration and operation process of the scan optical system for forming an image on the surface to be scanned by scanning a medium to be scanned according to this embodiment.

Figure 15:
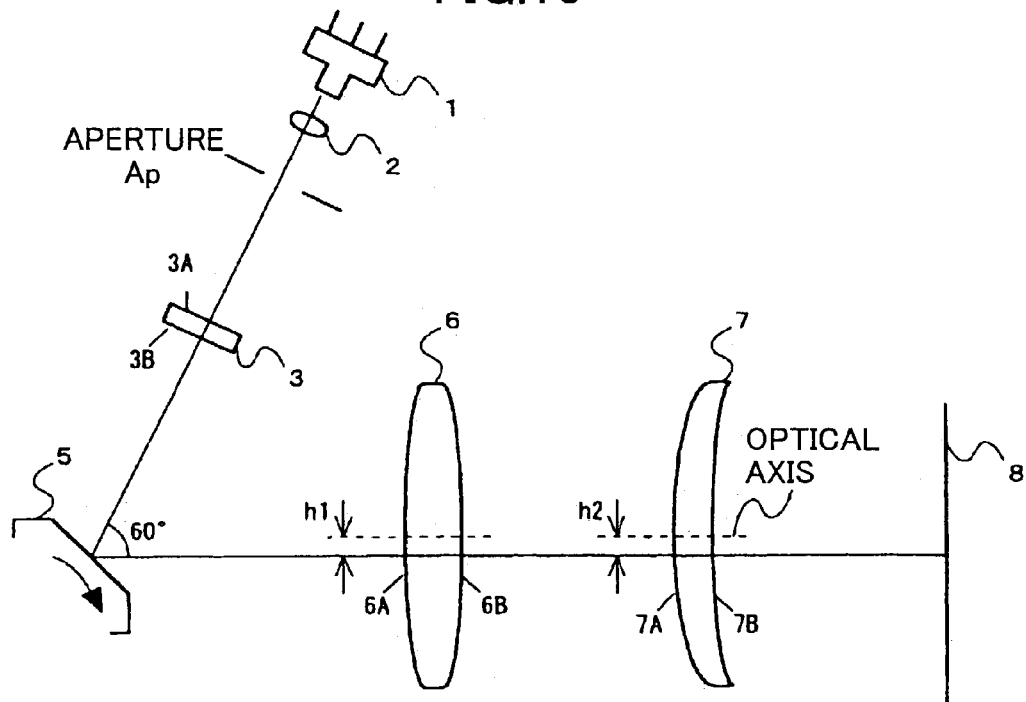
FIG. 15 is a schematic diagram showing the construction of the scan optical system corresponding to each medium to be scanned according to the embodiments.
Figure 16:
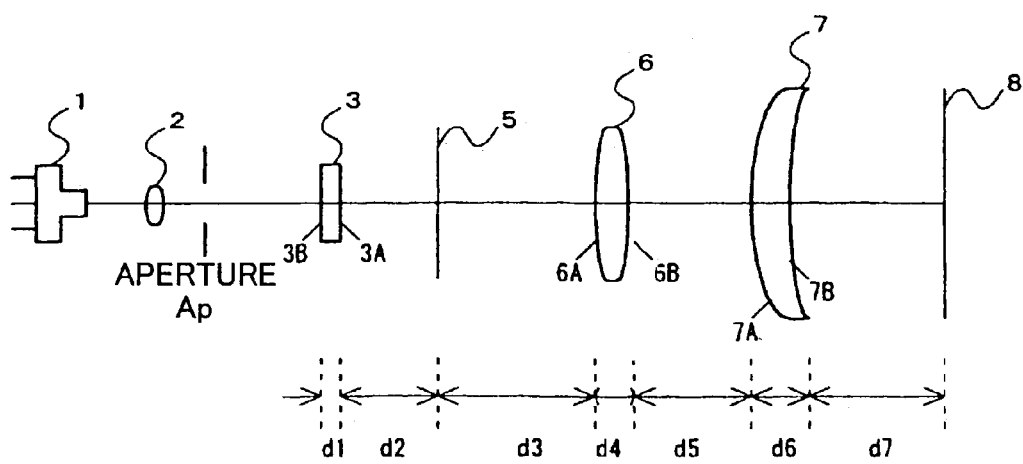
FIG. 16 is a schematic diagram showing the positional relationship among each component of FIG. 15.

FIGS. 15 and 16 show layouts of the scan optical systems according to the present invention and corresponding to each medium to be scanned. The light beam (flux) radiated from a light source 1 is coupled (converted) to a desired light beam (flux) state by a coupling lens 2. In this case, the light flux is coupled to a generally parallel light flux. An LD, an LDA having a plurality of luminescence points, or a multi beam obtained by combining LDs by such as a prism may be used for the light source. By using a plurality of light sources, it is possible to decrease the number of revolutions of such as an optical deflector. Thus, it is possible to reduce the power consumption as well as to extend the life of the optical deflector.

The light flux radiated from the coupling lens 2 is incident on a cylinder lens 3 through an aperture Ap, and forms a long linear image on a polygon surface. Then, the light flux deflected by an optical deflector 5 forms an image on a surface 8 to be scanned while correcting the optical characteristics such as curvature of field and fθ characteristic of each of the main scan and the sub scan by resinous scan lenses 6 and 7 each including a resinous imaging element.

A description will be given of conditions under which the present invention is effectively applied.

It is preferable that the difference of oscillation wavelength in modulation between semiconductor lasers of a plurality of light source parts corresponding to a medium to be scanned be equal to or less than 10 nm.

In a case of multi beams, it is necessary to correct shifts (displacement) of dots of a single light beam. Moreover, it is also necessary to correct displacement of dots among the light beams. The displacement among the light beams hardly occurs at the start position of scan (start position of writing an image) by synchronizing each of the light beams. However, when the center wavelength of each of the light beams is different, due to chromatic difference of magnification of the scan lens, the dot position shift occurs on the scan end side. Consequently, by making the difference of wavelength between the multi beams 10 nm, it is possible to obtain an image having little dot position shift even at the scan end position.

In addition, each of the scan optical systems corresponding to each medium to be scanned uses an optical system designed to have the same characteristics. Thus, it is preferable that the difference of oscillation wavelength in modulation be equal to or less than 10 nm among semiconductor lasers of the plurality of light beam sources corresponding to each medium to be scanned, since in that case, optical characteristics of each medium to be scanned are controlled to be the same.

Further, it is preferable that wavelength variation between pulses be equal to or less than 2 nm in modulation of each semiconductor laser light beam of the plurality of light beam sources corresponding to each medium to be scanned.

FIGS. 15 and 16 show the optical systems according to embodiments of the present invention.

Generally, there is still another trivial factor that may cause wavelength variation bringing about chromatic difference of magnification even when temperature change is excepted.

Figure 17A:
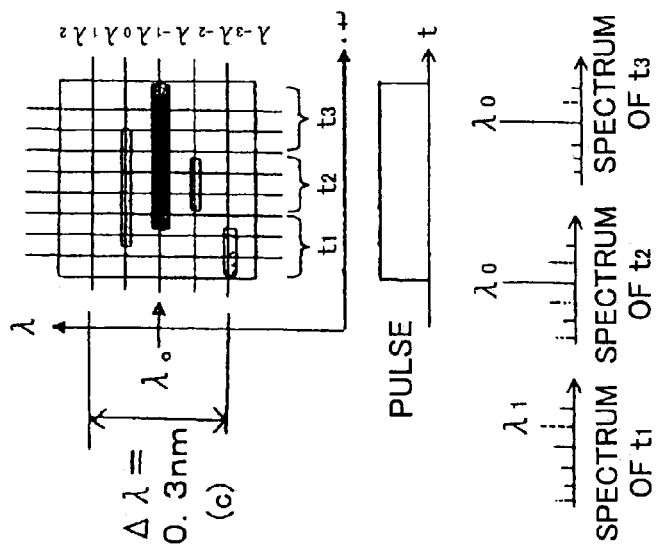
FIG. 17A is a schematic diagram showing a wavelength variation $\Delta\lambda$ within a single pulse.
Figure 18:
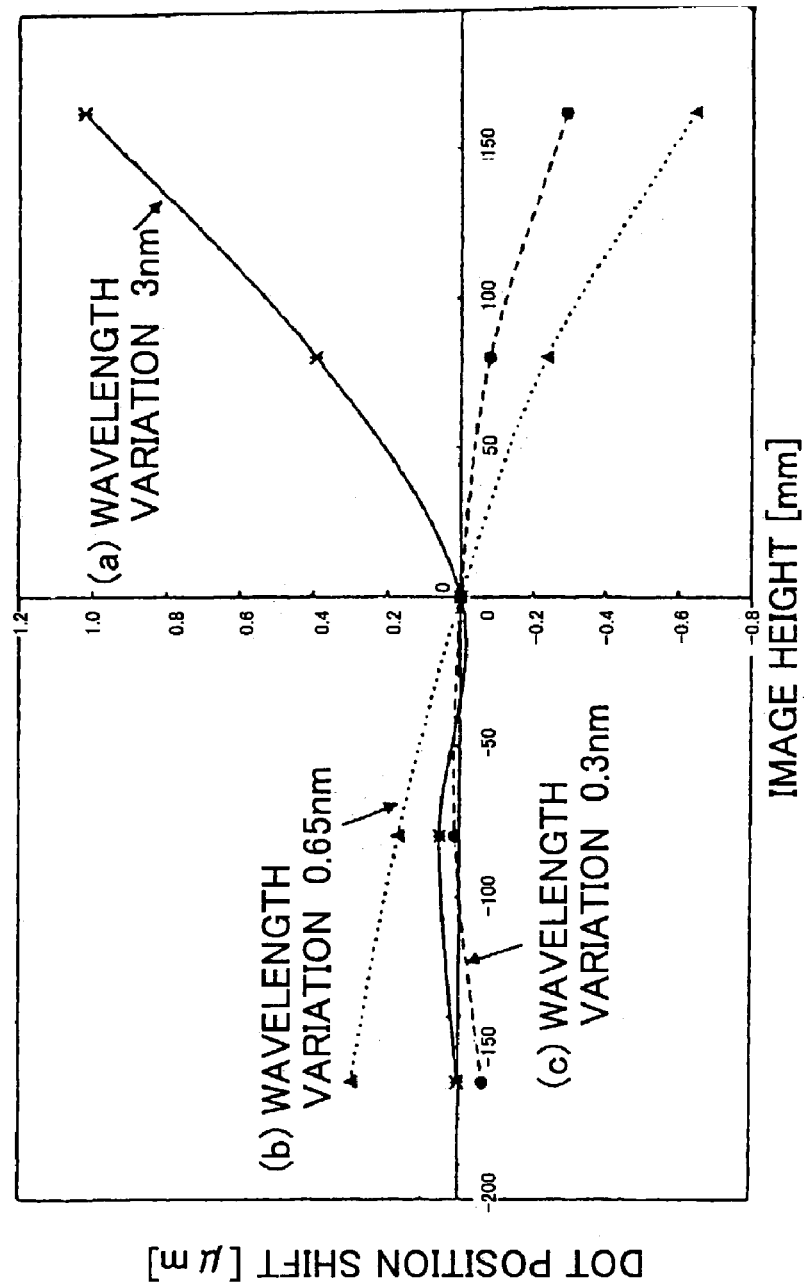
FIG. 18 is a graph showing dot position shifts on a surface to be scanned with the wavelength variations of FIGS. 17A, 17B and 17c.

As shown in FIG. 17A, in a case where wavelength variation Δλ in a single pulse occurs approximately 3 nm with respect to a wavelength λ designated by using the optical system, as shown by a comparative example in FIG. 18, the dot position on the surface to be scanned varies drastically depending on the height of an image.

Thus, a problem such as jitter in a vertical line image, degradation in graininess, or color shift in a case of a color image occurs.

Figure 17B:
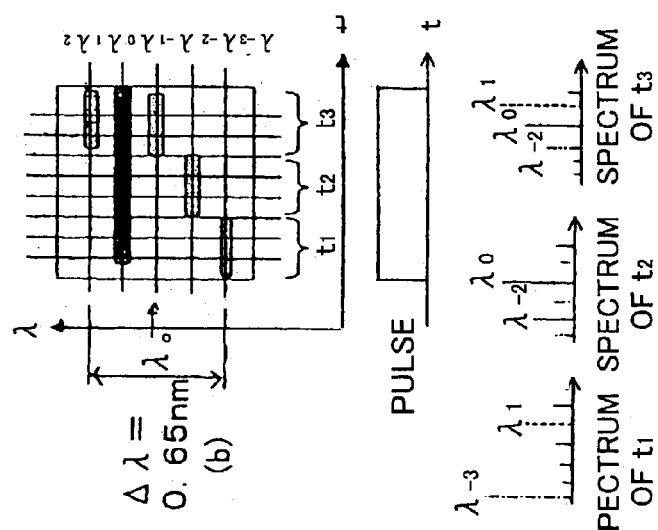
FIG. 17B is another schematic diagram showing the wavelength variation $\Delta\lambda$ within a single pulse.
Figure 17C:
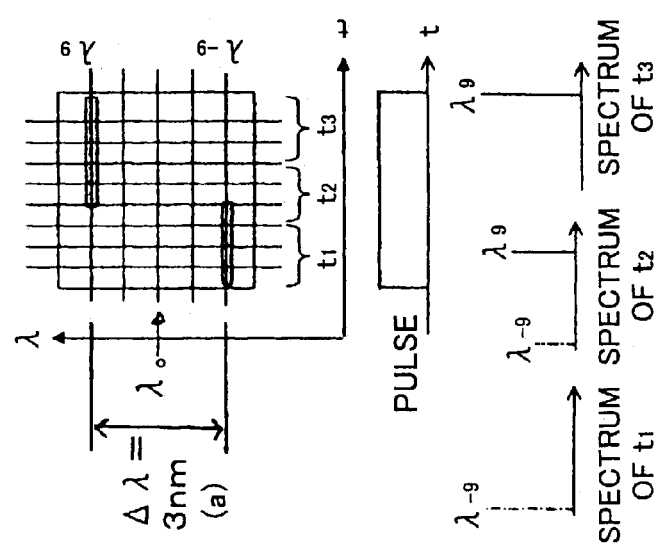
FIG. 17C is still another schematic diagram showing the wavelength variation $\Delta\lambda$ within a single pulse.

As in the present invention, in cases where a laser light beam source of which wavelength variation Δλ is 0.65 nm as shown in FIG. 17B is used, and where a laser light beam source of which wavelength variation Δλ is 0.3 nm is used as shown in FIG. 17C, dot position variation can be reduced as shown in FIG. 18. Accordingly, it is possible to obtain a good image.

In order to reduce the dot position shift to a negligible level, it is effective to control the wavelength variation in a single pulse equal to or less than 2 nm.

Additionally, it is preferable that the scan optical system (scan imaging element) satisfies the following condition.

$$|\Delta\lambda \times dH/d\lambda| < 5 \; [\mu m]$$

Δλ: wavelength variation in a single pulse of a laser light beam source dH/dλ: chromatic difference of magnification of scan imaging element (variation in image height (μm) with respect to wavelength variation of 1 nm)

It is possible to effectively reduce dot position shift variation by optimally setting wavelength variation in a single dot and chromatic difference of magnification of the scan imaging element. When the dot position shift is equal to or less than 5 μm, the dot position shift hardly stands out when seen from human eyes.

According to FIGS. 17B and 17C, the dot position shift is set as follows.

$$\Delta\lambda \times dH/d\lambda = (0.65 \text{ nm}) \times (3.8 \; \mu m/nm)$$
$$= 2.5 \; [\mu m]$$
$$\Delta\lambda \times dH/d\lambda = (0.30 \text{ nm}) \times (3.8 \; \mu m/nm)$$
$$= 1.1 \; [\mu m]$$

Figure 19B:
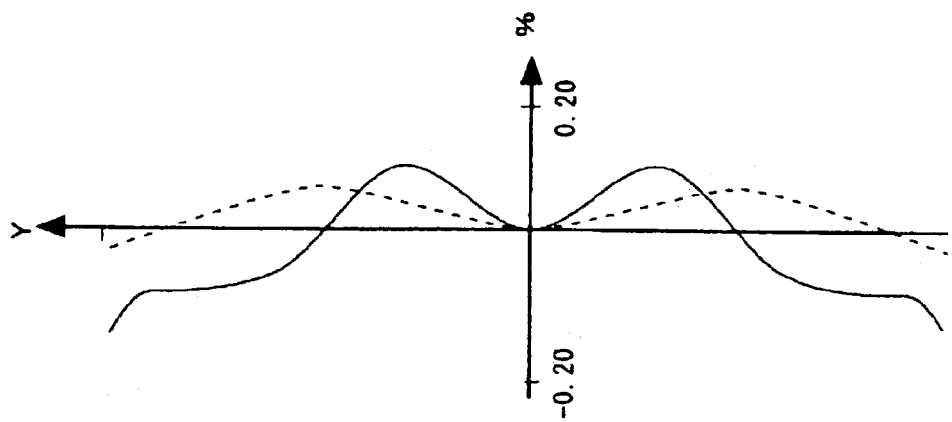
FIG. 19B is a graph showing the optical performance of the resinous scan lens 7 of FIG. 15.
Figure 19A:
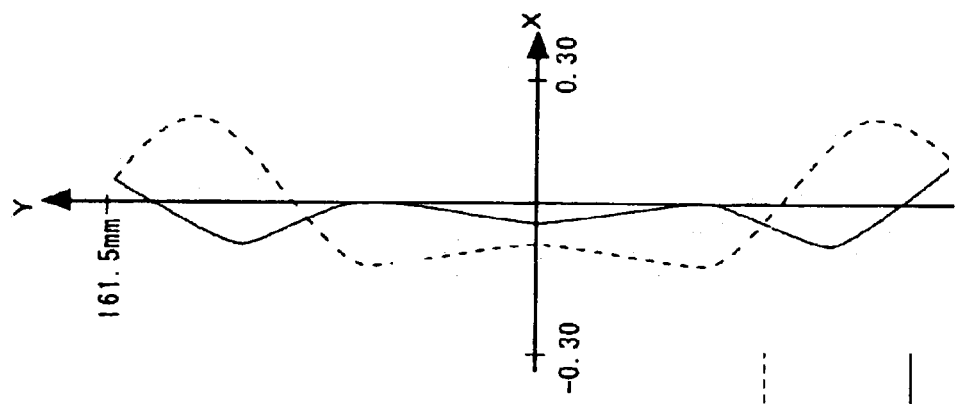
FIG. 19A is a graph showing the optical performance of the resinous scan lens 6 of FIG. 15.

The value 3.8 μm/nm of the chromatic difference of magnification of scan imaging element is the maximum value of the chromatic difference of magnification $(dH/d\lambda)_{max}$ that is derived based on a form function X (Y, Z) in an effective area of the resinous scan lenses 6 and 7 of FIG. 15. Also, the optical performances of the resinous scan lenses 6 and 7 used in this embodiment are shown in the graph of FIG. 19A and the graph of FIG. 19B, respectively.

The form function X (Y, Z) in the effective area is expressed as shown below.

$$X(Y, Z) = \frac{C_m Y^2}{1 + \sqrt{1 - (1+K)C_m^2 Y^2}} + \sum_{n=1}^{p} A_n Y^n + \frac{C_s(Y)Z^2}{1 + \sqrt{1 - (1+K_Z(Y))C_s^2(Y)Z^2}} + \sum_{j=1}^{r} \left(\sum_{h=0}^{q} d_{j,h} Y^h\right) Z^j \quad \text{Equation 1}$$

The first and second terms in the above equation represent the shape of the cross section in the main scan direction, that is, the depth in the optical axis direction where Cm is a paraxial curvature in the main scan surface of the optical axis, K is a conic constant, and A1, A2, A3, A4 . . . are coefficients of high orders.

Additionally, the third and fourth terms represent the shape of a cross section in the sub scan direction, that is, the depth in the optical axis where $C_s(Y)$ is a paraxial curvature in the sub scan surface at Y, $K_z(Y)$ is a conic constant, and $d_{ij}$ is a coefficient of a high order.

Further, in Equation 1,

Y is a direction corresponding to the main scan direction,

Z is a direction corresponding to the sub scan direction,

Cm or 1/Rm is a paraxial curvature in the direction corresponding to the main scan near the optical axis, $C_s(0)$ or $1/R_s(0)$ is a paraxial curvature in the direction corresponding to the sub scan near the optical axis, $C_s(Y)$ is a paraxial curvature in the direction corresponding to the sub scan at a position Y corresponding to the main scan, $K_z(Y)$ is a conic constant representing a quadric surface in a direction corresponding to the sub scan at the position Y corresponding to the main scan, $C_s(Y)=1/R_s(0)+B1\cdot Y+B2\cdot Y^2+B3\cdot Y^3+B4\cdot Y^4+B5\cdot Y^5+\ldots$, and $K_z(Y)=C0+C\cdot Y+C2\cdot Y^2+C3\cdot Y^3+C4\cdot Y^4+C5\cdot Y^5+\ldots$.

In order to derive the value of the maximum chromatic difference of magnification $(dH/d\lambda)_{max}$, physical values of devices of the scan optical systems shown in FIGS. 15 and 16 are shown below.

light source 1
    wavelength: 780 nm
coupling lens 2
    focal distance: 27 mm
    coupling operation: collimation operation
polygon mirror 5
    number of deflection/reflection surface: 5
    radius of inscribed circle: 18 mm
    angle between incident angle of beam from light source side and optical axis of scan optical system: 60°
write width: ±161.5 mm
field angle: ±40.6°
d1=7 mm, d2=43.608 mm,
curvature radius of 3A: main ∞, sub 23.69 mm, 3B: flat surface,
refraction factor of cylinder lens 3=1.733278 ($\lambda$=655 nm, when 25° C.),
d3=70.662 mm, d4=30 mm, d5=66.622 mm, d6=8.5 mm, d7=161.216 mm, h1=0.27 mm, h2=0.27 mm,
refraction factor of resinous scan lenses 6 and 7: 1.527238 ($\lambda$=780 nm)

Each coefficient used in Equation 1 is as follows.

(Shape of 6A)
Rm=−1030.233346, Rs0=−89.518927
K −4.041619E+02
A4 6.005017E−08
A6 −7.538155E−13
A8 −4.036824E−16
A10 4.592164E−20
A12 −2.396524E−24
B1 −9.317851E−06
B2 3.269905E−06
B3 4.132497E−09
B4 −4.207716E−10
B5 −1.170114E−12
B7 2.347965E−16
B8 −6.212795E−18
B9 −3.967994E−20
B10 −3.873869E−21
B11 3.816823E−24
B12 4.535843E−25
Ci 0
$d_{ij}$ 0

(Shape of 6B)
Rm=−109.082474, Rs0=−110.881332
K −5.427642E−01
A4 9.539024E−08
A6 4.882194E−13
A8 −1.198993E−16
A10 5.029989E−20
A12 −5.654269E−24
B2 −3.652575E−07
B4 2.336762E−11
B6 8.426224E−14
B8 −1.026127E−17
B10 −2.202344E−21
B12 1.224555E−26
Ci 0
$d_{ij}$ 0

(Shape of 7A)
Rm=1493.654587, Rs0=−70.072432
K 5.479389E+01
A4 −7.606757E−09
A6 −6.311203E−13
A8 6.133813E−17
A10 −1.482144E−21
A12 2.429275E−26
A14 −1.688771E−30
B2 −8.701573E−08
B4 2.829315E−11
B6 −1.930080E−15
B8 2.766862E−20
B10 2.176995E−24
B12 −6.107799E−29
Ci 0
$d_{ij}$ 0

(Shape of 7B (Sub Non-arc Surface))
Rm=1748.583900, Rs0=−28.034612
K −5.488740E+02
A4 −4.978348E−08
A6 2.325104E−12
A8 −7.619465E−17
A10 3.322730E−21
A12 −3.571328E−26
A14 −2.198782E−30
B1 −1.440188E−06
B2 4.696142E−07
B3 1.853999E−11
B4 −4.153092E−11
B5 −8.494278E−16
B6 2.193172E−15
B7 9.003631E−19
B8 −9.271637E−21
B9 −1.328111E−22
B10 −1.409647E−24
B11 5.520183E−27
B12 4.513104E−30
C0 −9.999999E−01
d4,0 −1.320849E−07
d4,2 −1.087674E−11
d4,4 −9.022577E−16
d4,6 −7.344134E−20
d6,0 9.396622E−09
d6,2 1.148840E−12
d6,4 8.063518E−17
d6,6 −1.473844E−20

Next, a description will be given of an optical scan device and an image forming apparatus using the optical scan device according to the present invention, with reference to FIGS. 20 through 32.

Figure 20:
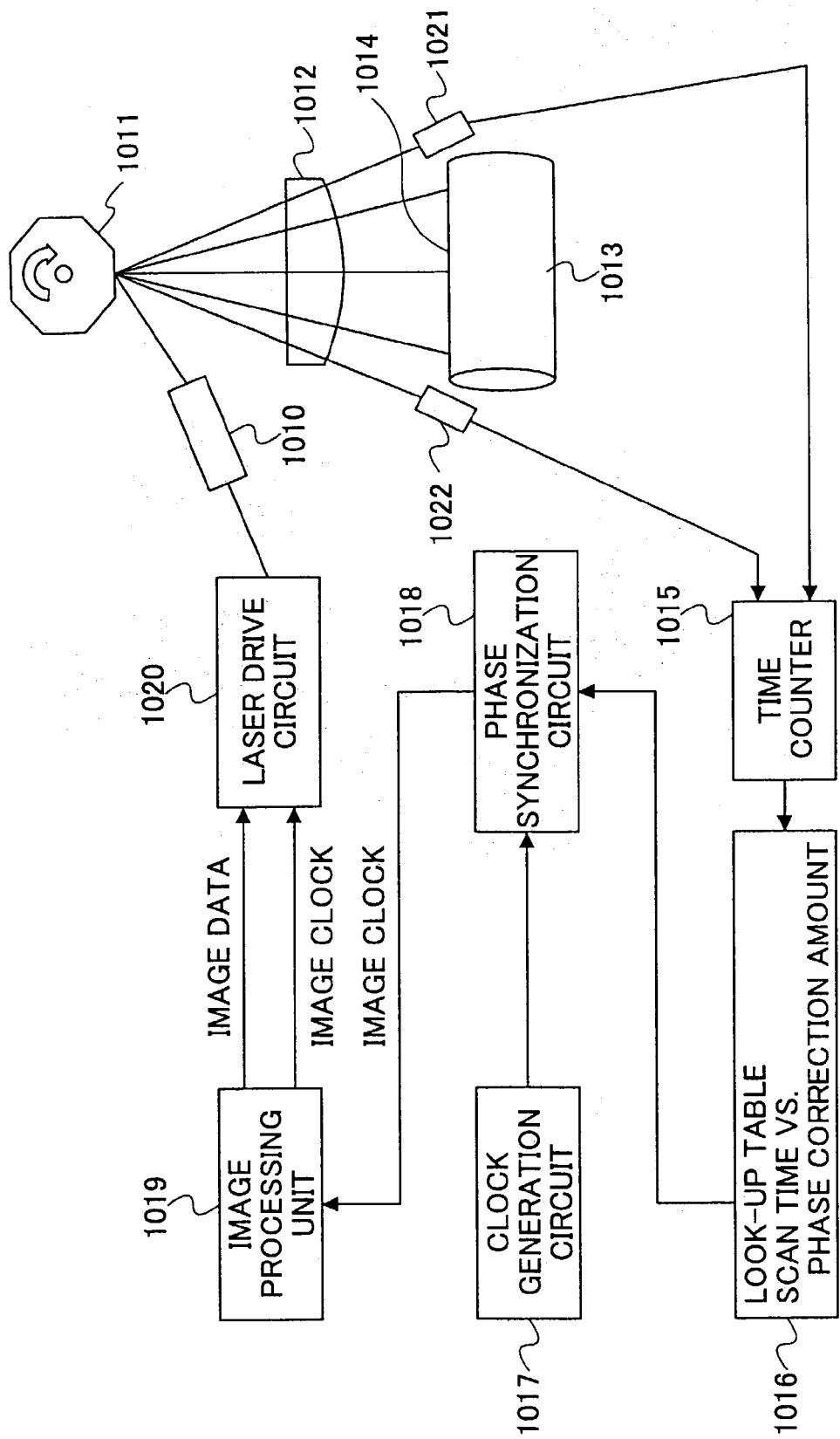
FIG. 20 is a block diagram schematically showing an embodiment of an optical scan device according to the present invention and a signal system.

In FIG. 20, a semiconductor laser unit 1010 as a light beam source includes a semiconductor laser, a coupling lens, a cylindrical lens and so on. The laser beam emitted from the semiconductor laser unit 1010 is deflected (reflected) by a polygon mirror 1011 as an optical deflector in a predetermined angle range in a constant angular velocity manner. A scan lens 1012 is arranged in the path of the deflected (reflected) light. A surface 1014 to be scanned is arranged in the path of the beam that passed through the scan lens 1012. The scan lens 1012 possesses the f–θ characteristic, converges the beam deflected (reflected) by the polygon mirror 1011 in the constant angular velocity manner on the surface 1014 to be scanned as a light spot and scans the surface 1014 in a constant linear velocity manner. This scan direction is the main scan direction. In this example, the surface of a photo conductor 1013 constitutes the surface 1014 to be scanned.

In the above-described deflection scan area, a predetermined scan area of the surface 1014 to be scanned is an effective writing area. Optical detectors 1021 and 1022 are arranged in opposing external areas adjacent to the effective writing area. The optical detector arranged on the start side of writing constitutes a first optical detector 1021, and the optical detector on the end side of writing constitutes a second optical detector 1022. A counter circuit (time counter) 1015 as a measuring means measures the scan time required for the laser beam to cross the area between the first optical detector 1021 and the second optical detector 1022. Based on a variation amount of the measured scan time, a correction amount of a dot position in the main scan direction is set according to a look-up table that is recorded beforehand. The correction amount data are input to a phase synchronization circuit 1018. The phase synchronization circuit 1018 performs phase shift of a clock from a clock generation circuit 1017 in accordance with the correction amount data, and outputs the clock as an image clock.

The image clock signal is input to an image processing unit 1019. Based on the image clock signal, the image processing unit 1019 outputs an image clock signal and an image data signal to a laser drive circuit 1020. The laser drive circuit 1020 drives the semiconductor laser unit 1010. The laser drive circuit 1020 outputs image data in synchronization with the image clock signal so as to drive the semiconductor laser unit 1010. The semiconductor laser unit 1010 emits a laser beam that is modulated according to the image data.

As described above, it is possible to control a pixel (hereinafter referred to as a "dot") position on the surface 1014 to be scanned to an arbitrary position by generating the image clock that is phase shifted by the phase synchronization circuit 1018 based on the correction amount data, and controlling a light-emitting time of the semiconductor laser unit 1010 according to the image data generated by the image processing unit 1019.

Figure 21:
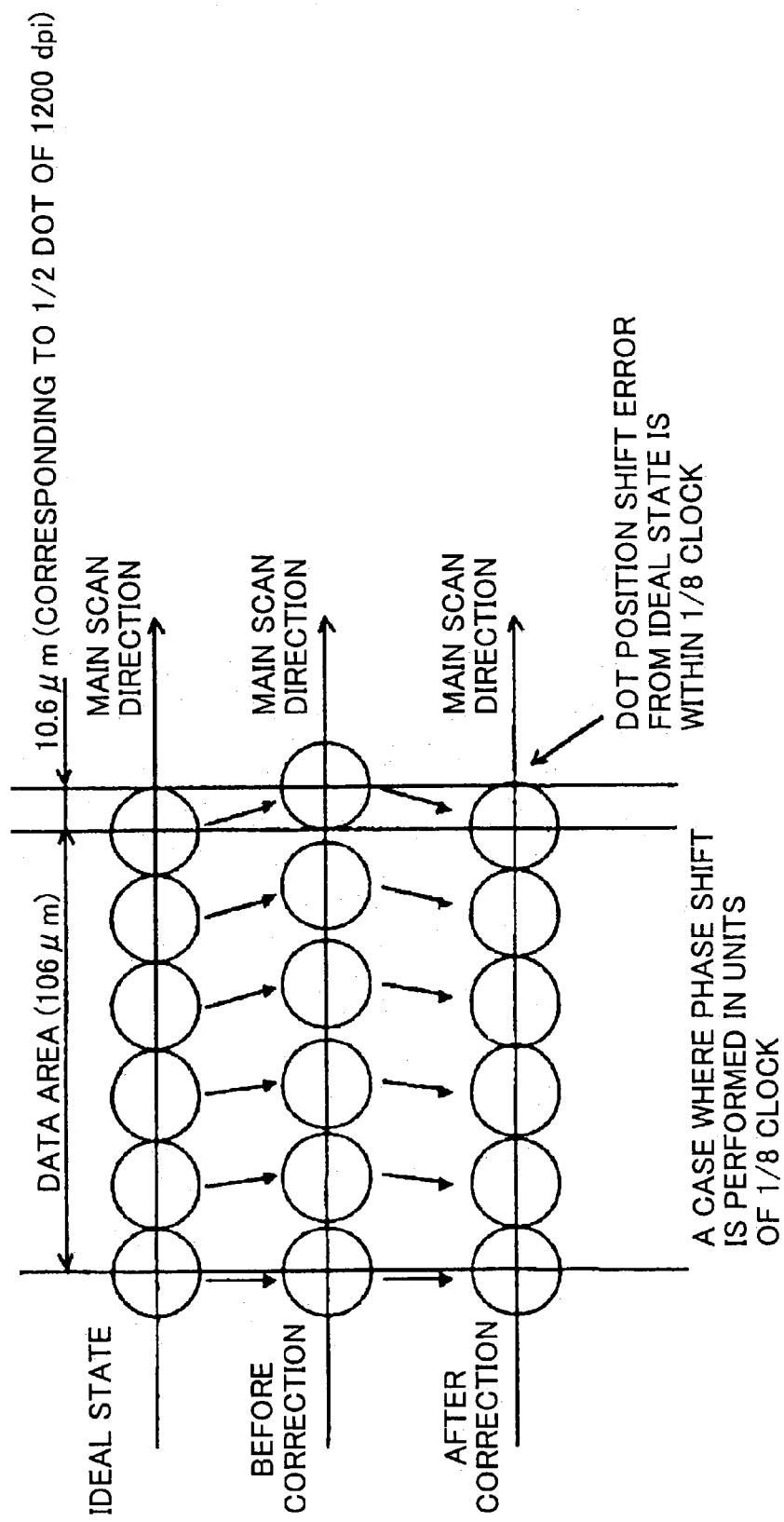
FIG. 21 is a schematic diagram showing correction of a dot position shift in a main scan direction according to the embodiment, by contrasting a state before the correction with an ideal state.

FIG. 21 shows the idea of a correction method of the dot position according to the above-mentioned embodiment. In FIG. 21, the horizontal direction is the main scan direction, and dots are indicated by circles. In FIG. 21, the upper part indicates an ideal state, the middle part indicates a state before correction, and the lower part indicates a state after correction. In the example shown in FIG. 21, the dot position shift before the correction is ½ dot with respect to the ideal state. It is possible to come close to the ideal state by correcting the dot position shift by the phase shift. In this embodiment, though a detailed description will be given later, an error with respect to the dot position in an ideal state falls within ⅛ clock by performing the phase shift in increments of a ⅛ *clock*.

As mentioned above, the phase shift amount of a dot position is set by using the look-up table 16. In other words, the relationship between the scan time of the area between the first optical detector 1021 and the second optical detector 1022, and the correction amount of the dot position is recorded in advance. Then, the phase shift amount of a dot position is set by referring to the look-up table 1016 based on the measured result of the scan time of the area between the first optical detector 1021 and the second optical detector 1022.

Figure 22:
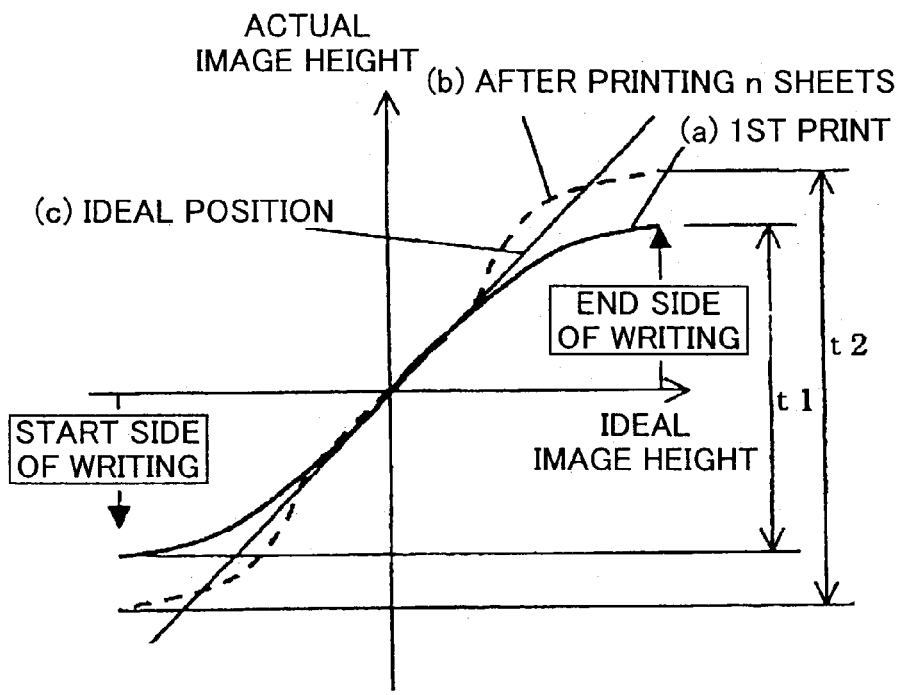
FIG. 22 is a graph showing the idea of a dot position shift of a laser scan optical system.

A description will be given of the dot position shift of the laser scan optical system, with reference to FIG. 22. In FIG. 22, the horizontal axis represent the ideal image height, that is, an ideal dot position base on the image data. The vertical axis represents the actual image height, that is, the actual dot position produced by the laser scan optical system. Ideally, it is preferable that constant linear velocity scan be performed and a linear characteristic curve c. having a slope value 1 be made, that is, the fθ characteristic be optically well corrected. However, generally, the characteristic curve is not linear but curved as shown by curved lines a and b, for example, since variation in scan speed occurs for the following reasons. In other words, the actual dot positions in the main scan direction are shifted with respect to the ideal dot positions in the main scan direction.

1. fθ characteristic of the scan lens 12 is not sufficiently corrected 2. degradation in the precision of optical components of the laser scan optical systems and accuracy in mounting to a housing 3. fθ characteristic is degraded due to variation in focal distance, which variation is caused by deformation of the optical components and variation in refraction factors of the optical components, according to variation in the environment such as temperature and moisture in an image forming apparatus Especially, it is difficult to avoid the dot position shift in the main scan direction according to the environmental variation (#3 in the above conditions) even if optical adjustment or electrical correction is performed before shipping. For example, even when a characteristic curve in the first print is (a), as the temperature in an apparatus is increased by printing out successively, it is possible that the characteristic curve (a) is changed to the characteristic values symmetrical with respect to the ideal curve (c), as shown by a characteristic curve (b). Hence, there is a case where the hue of the print after a plurality of prints is different from the hue of the first print.

Figure 23:
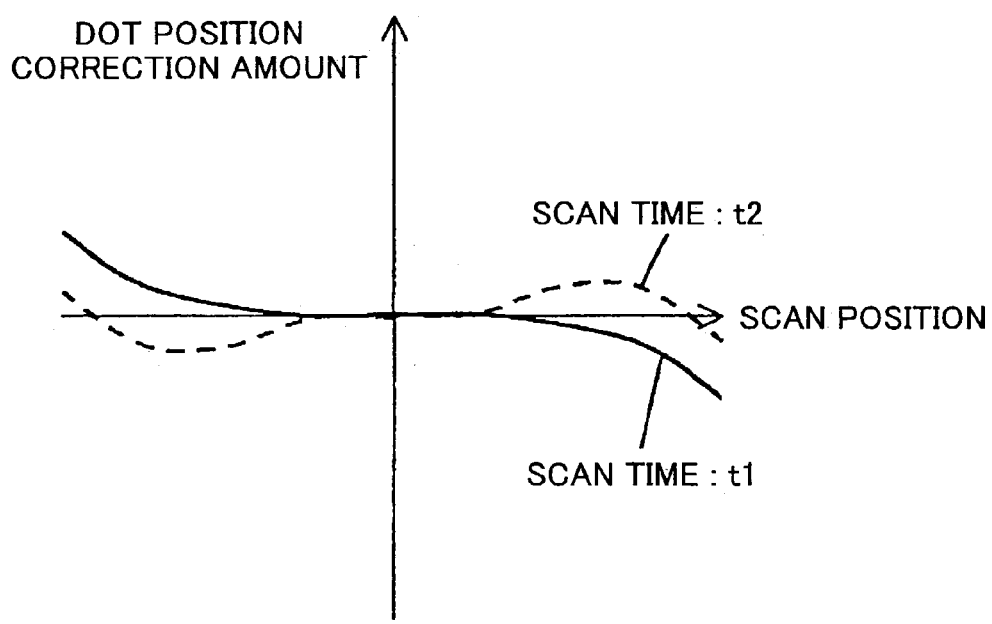
FIG. 23 is a graph showing an example of the difference between an ideal position of a dot and a correction amount with respect to a scan time in the laser scan optical system.

Accordingly, in this embodiment, the look-up table 1016 is created by recognizing the characteristic values of the relationship between the ideal image height and the actual image height of the laser scan optical system to be used, which characteristic values are obtained in advance through preliminary experiments or simulations. That is, correction amounts with respect to scan times t1 and t2 are obtained, from the data as shown in FIG. 22, as the differences between ideal positions and actual positions as shown in FIG. 23, and the relationship thereof is recorded beforehand in a memory as the look-up table 1016. The phase shift amount is determined by successively measuring the optical scan time in actual print drive, and obtaining the dot position correction amount from the look-up table 1016 based on the measured scan time, so that the dot positions become the ideal positions.

According to this embodiment, it is possible to effectively correct the dot position shift in the main scan direction caused by the environmental variation in the apparatus.

It is preferable that the timing of performing the above-described correction be set in the interval in which image data are not transferred, such as immediately after the start of printing, or the time between print and the next print when printing out.

Additionally, in this embodiment, the optical detectors 1021 and 1022 are provided at two positions: the start side of writing and the end side of writing. However, it is possible to improve the accuracy of dot positions in the main scan direction by providing more optical detectors and collecting more dot position data in the main scan direction so as to more finely correct dot position shifts in the main scan direction.

When realizing the above-described correction of dot position shift in the main scan direction, if the correction is performed on all image data in the main scan direction, a huge memory capacity is required, the cost of the control system is increased, and the circuit size is increased. Further, the time spent for the correction process is not negligible.

Figure 24:
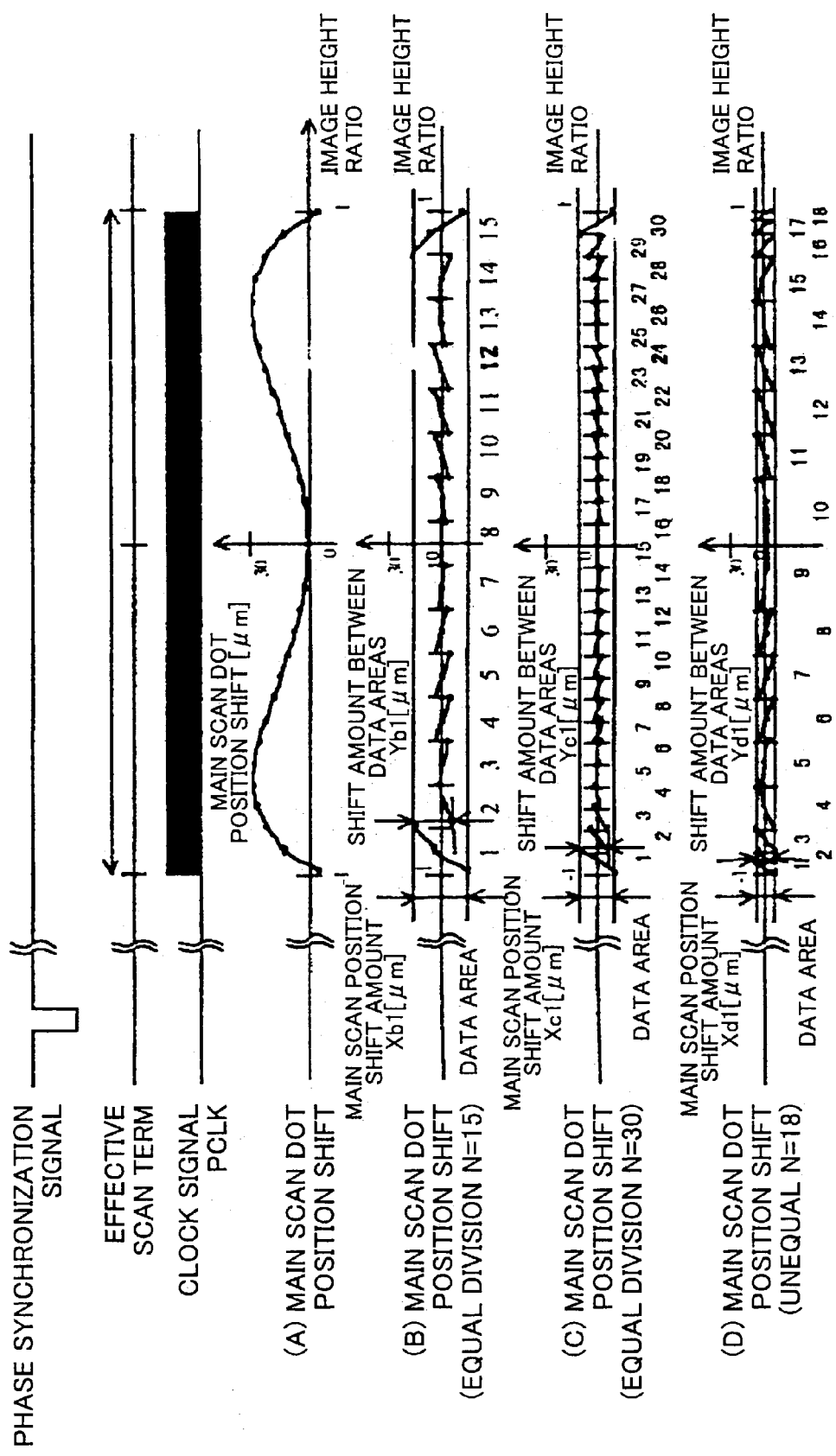
FIG. 24 is a wave form chart showing various examples of a dot position shift in the main scan direction in an embodiment where an effective writing area is divided into a plurality of image data areas and a correction value is set for each of the data areas.

In order to solve this problem, the effective writing area should be divided into a plurality of image data areas, and a correction value should be set for each of the data areas. FIG. 24 shows such an embodiment.

In FIG. 24, (A) through (D) indicate characteristic curves of dot position shift amounts in the main scan direction. The vertical axis represents the shift amount of a main scan position, and the horizontal axis represents the image height. For example, a case is considered where a dot position shift in the main scan direction obtained from the look-up table 16 based on a scan time between two points measured in a print operation is indicated by (A) in FIG. 24. In such a case, it is possible to finely correct the dot position shift without increasing the memory capacity by dividing all image data into a plurality of areas as indicated by (B) through (C) in FIG. 24, and by regarding a representative value of the amount of the dot position shift in the main scan direction of each data area, an average value, for example, as a correction value. In addition, (B) in FIG. 24 indicates a case where all image data in the main scan direction are equally divided into 15 areas, and (C) in FIG. 24 indicates a case where all image data in the main scan direction is equally divided into 30 areas. Also, (D) in FIG. 24 indicates a case where all image data in the main scan direction is divided unequally into 18 areas.

As is clear from (B) through (D) in FIG. 24, by dividing the effective writing area into a plurality of image data areas, and setting a correction value for each of the data areas, it is possible to more finely correct a dot position shift in the main scan direction so as to improve the accuracy of dot positions in the main scan direction.

For example, in a case where the phase of the pixel clock is shifted in units of ±⅛ dot, it is possible to adjust a correction amount of the linearity in the range from 0% to 12.5%. When writing with the density of 1200 dpi, it is possible to reduce a dot position shift in the main scan direction in the effective writing area to 2.6 μm (21.2 μm/8).

As is clear from the result shown in FIG. 24, the higher the number of divided areas in an image data area is, the better the correction of a dot position shift can be performed. However, it is preferable that an optimum dividing number be determined considering the limitations of memory capacity and time required for the correction process.

The above-described correction of a dot position shift should be performed such that the phase of the pixel clock is shifted by using a high-frequency clock having a higher frequency than that of the pixel clock. A description will be given of an example of a circuit performing such phase shift and the operation thereof, with reference to FIGS. 25 and 26.

Figure 25:
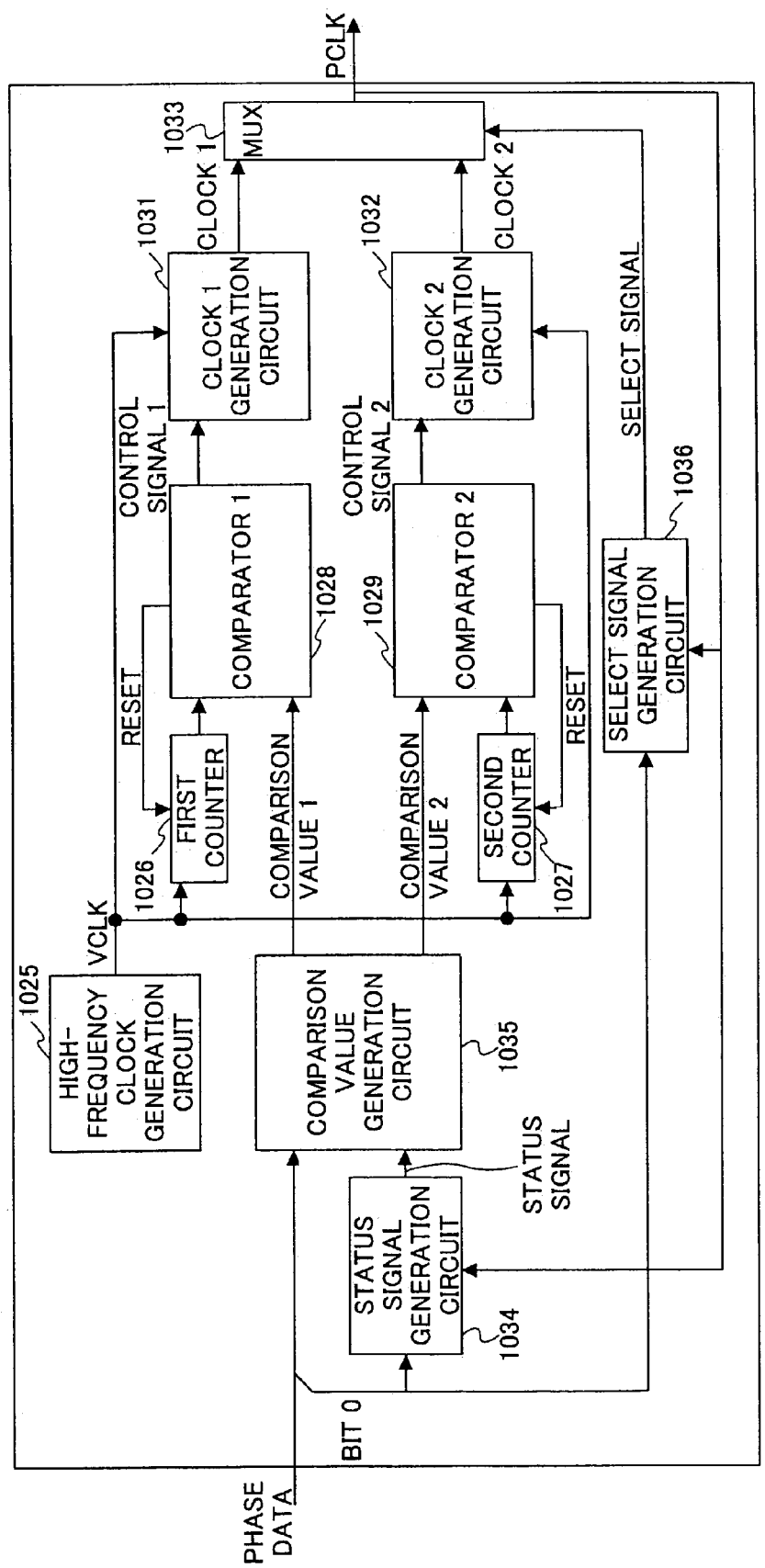
FIG. 25 is a block diagram showing an example of a phase shift circuit that can be applied to the present invention.

In FIG. 25, a high-frequency clock VCLK generated by a high-frequency clock generation circuit 1025 is input to a first counter 1026 and a second counter 1027, and at the same time, to a first clock generation circuit 31 and a second clock generation circuit 1032. On the other hand, a phase data signal bit0 is input to a status signal generation circuit 1034, a comparison value generation circuit 1035, and a select signal generation circuit 1036. The status signal generation circuit 1034 generates a status signal based on the phase data signal bit0 and a feedback signal from a multiplexer (MUX) 1033, which will be described later. The status signal and the phase data signal bit0 are compared in the comparison value generation circuit 1035, and thus comparison values 1 and 2 are generated.

The comparison value 1 is compared with a count value of the first counter 1026 by a first comparator 1028, and the comparison result is input, as a control signal 1; to the first clock generation circuit 1031. In addition, the comparison value 2 is compared with a count value of the second counter 1027 by a second comparator 1029, and the comparison result is input, as a control signal 2, to the second clock generation circuit 1032. Further, the comparison results of the first comparators 1028 and the second comparators 1029 are input, as reset signals, to the first counter 1026 and the second counter 1027, respectively. The first clock generation circuit 1031 outputs a clock signal 1 based on the high-frequency clock VCLK and the control signal 1, and inputs the signal to the multiplexer 1033. The second clock generation circuit 1032 outputs a clock signal 2 based on the high-frequency clock VCLK and the control signal 2, and inputs the signal to the multiplexer 1033. The multiplexer 1033 generates and outputs a pixel clock PCLK based on the clock signals 1 and 2 and the select signal. The pixel clock PCLK is fed back to the status signal generation circuit 1034 and the select signal generation circuit 1036.

Figure 26:
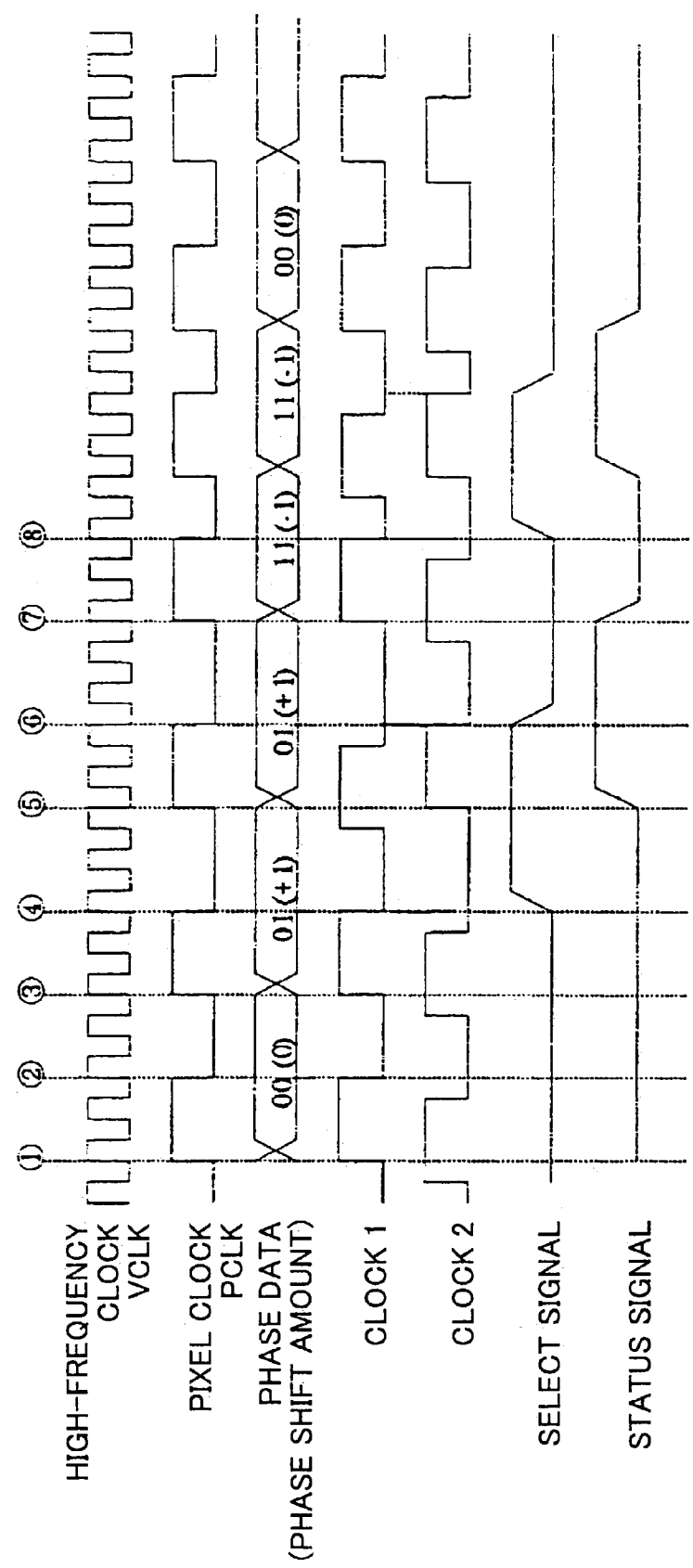
FIG. 26 is a timing chart for explaining the operation of the phase shift circuit.

Next, a description will be given of the operation of the phase shift circuit shown in FIG. 25, with reference to FIG. 26 and Table 3.

TABLE 3

| phase shift amount | phase data |
|---|---|
| 0 | 00 |
| +⅛ POLK | 01 |
| −⅛ POLK | 11 |

A description will be given of a case where the pixel clock PCLK corresponding to four cycles of the high-frequency clock VCLK is generated and shifted for +⅛ PCLK or −⅛ PCLK as a phase shift amount. Table 3 shows the phase shift amount and the corresponding phase data that are externally given. FIG. 26 shows the phase shift amount and switching between the clock 1 and the clock 2. First, the multiplexer 1033 selects the clock 1. Phase data "00" is given in synchronization with the pixel clock PCLK ①. Since the phase data bit0 is "0", the select signal remains "0", and the clock 1 is selected and outputs as the pixel clock PCLK as is ②. Hence, the pixel clock PCLK assumes a clock having a phase shift amount 0.

Next, "01" is given as the phase data ③. In this case, since the phase data bit0 is "1", the select signal is toggled to "1" at the fall of the pixel clock PCLK so that the clock 2 is selected and output as the pixel clock PCLK ④. The clock 2 then is, as shown in FIG. 26, a clock having a cycle lengthened by 1 VCLK. Hence, the pixel clock PCLK of which phase is shifted only for +⅛ PCLK is obtained.

Next, when "01" is given again as the phase data ⑤, since the phase data bit0 is "1", the select signal is toggled to "0" at the fall of the pixel clock PCLK so that the clock 1 is selected and output as the pixel clock PCLK ⑥. The clock 1 then is, as shown in FIG. 26, a clock having a cycle lengthened by 1 VCLK. Hence, the pixel clock PCLK of which phase is shifted only for +⅛ PCLK is obtained.

Next, "11" is given as the phase data ⑦. Since the phase data bit0 is "1", the select signal is toggled to "1" at the fall of the pixel clock PCLK so that the clock 2 is selected and output as the pixel clock PCLK ⑧. At this time, as shown in FIG. 26, the clock 1 is a clock having a cycle shortened by 1 VCLK. Hence, the pixel clock PCLK of which phase is shifted only for −⅛ PCLK is obtained.

In this manner, by varying the cycles of the clocks 1 and 2 in accordance with the phase data, and outputting either the clock 1 or the clock 2 as the pixel clock PCLK by switching between the clocks 1 and 2, it is possible to obtain the pixel clock PCLK of which phase is shifted in units of a ⅛ PCLK.

A phase data storing circuit is configured such that data setting is performed externally and phase data are output sequentially in synchronization with the pixel clock PCLK. Hence, in a case of data requiring the same phase data in every line, such as phase data for correcting variations in scanning, which variations are caused by the characteristic of the scan lens, if the phase data are stored in the phase data storing circuit in advance and are sequentially output from the first phase data in the phase data storing circuit each time a line is scanned, it is not necessary to externally output the same data for each line.

It should be noted that the phase data input in the example of the circuit shown in FIG. 25 are generated via the phase synchronization circuit 18 according to a dot position shift correction amount that is set from the look-up table 16 based on the scan time required to pass the two optical detectors.

Figure 27:
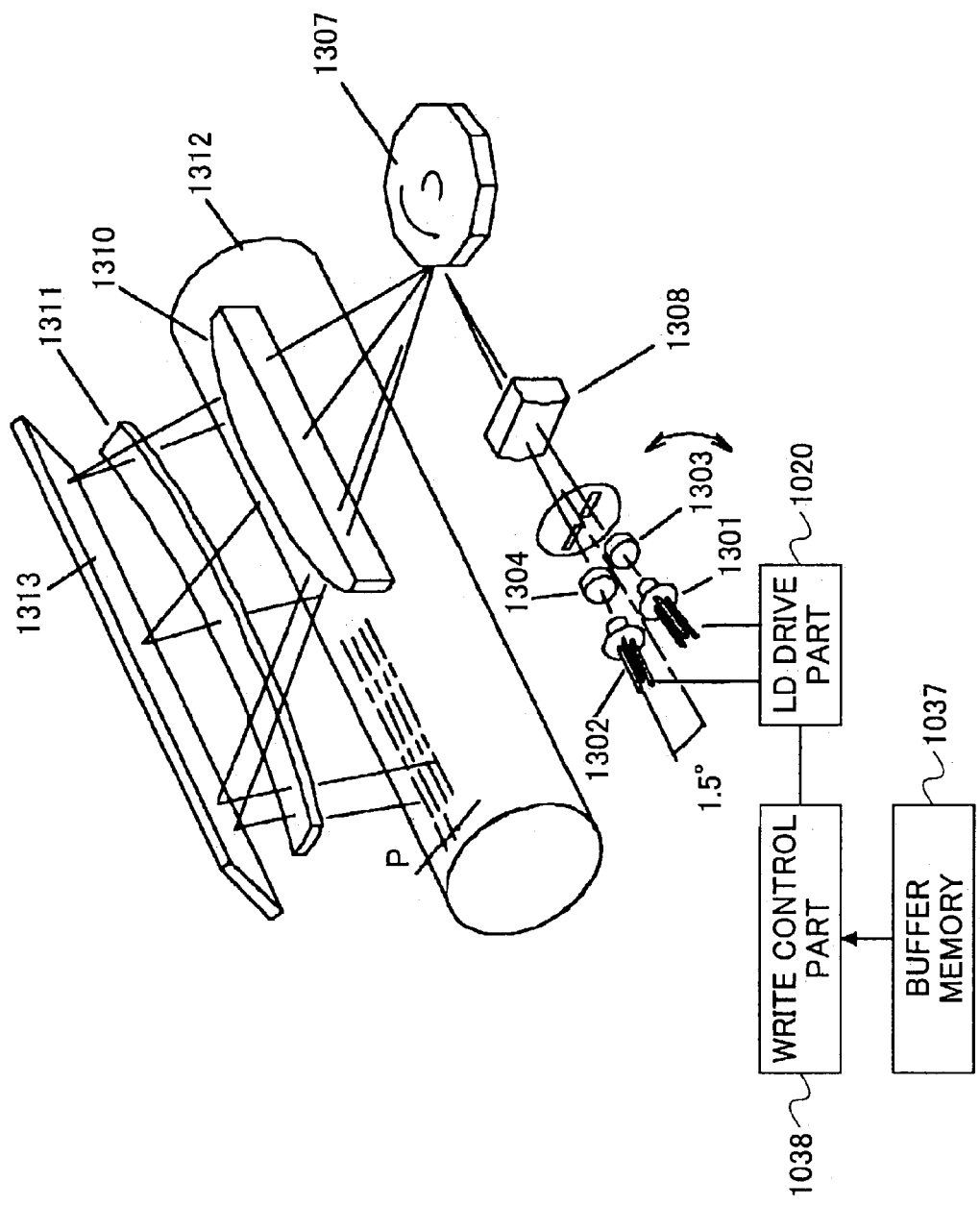
FIG. 27 is a perspective view showing another embodiment of the optical scan device according to the present invention.

The light beam source of the laser scan device should be a multi-beam light source that optically combines a plurality of semiconductor lasers, or that is constituted by a monolithic semiconductor laser array. FIG. 27 shows an embodiment of a multi-beam scan device. In FIG. 27, two semiconductor lasers 1301 and 1302 are arranged as light beam sources such that the semiconductor lasers 1301 and 1302 are symmetric with respect to the optical axis of collimate lenses 1303 and 1304 in the sub scan direction. The semiconductor lasers 1301 and 1302 are laid out such that their optical axes match those of the collimate lenses 1303 and 1304, respectively. The semiconductor lasers 1301 and 1302 are symmetrically placed with respect to the main scan direction at an angle of emergence, and respective exit axes cross at a reflection (deflection) point on a polygon mirror 1307 as an optical deflector. A plurality of beams emitted from each of the semiconductor lasers 1301 and 1302 are collectively scanned by the polygon mirror 1307 via a cylinder lens 1308, and an image is formed on a surface to be scanned of a photo conductor 1312 by a f-θ lens 1310 and a toroidal lens 1311.

A buffer memory 1037 stores print data for a single line for each of the semiconductor lasers 1301 and 1302 as the light beam sources. The stored print data are read at every reflection (deflection) surface of the polygon mirror 1307. A write control part 1038 drives and controls a laser drive circuit (LD drive part) 1020 so that writing or recording on the surface to be scanned is performed in units of two lines simultaneously.

Figure 28:
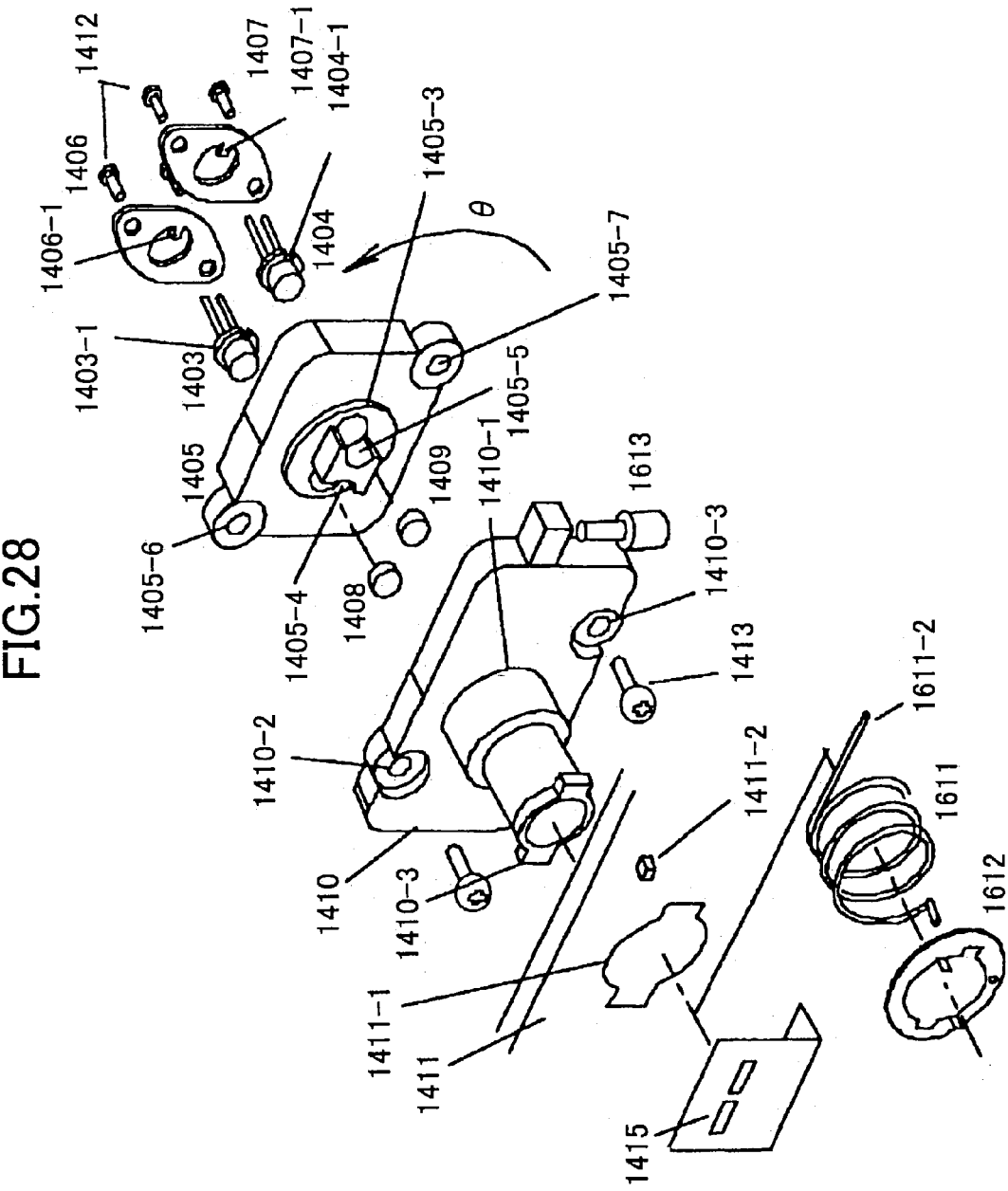
FIG. 28 is an exploded perspective view showing an example of a light source unit that can be applied to the present invention.

FIG. 28 shows an example of the structure of a light beam source unit that can be used for the laser scan device. In FIG. 28 two semiconductor lasers 1403 and 1404 as the light beam-sources are each fixed with a predetermined angle with respect to the main scan direction, a minute slope of approximately 1.5°, for example. In order to achieve such a fixed construction, holes in which the semiconductor lasers 1403 and 1404 are fit are formed on the backside of a base member 1405, and the central axis lines of the fitting holes are inclined only at approximately 1.5°. Cylindrical heat sink parts 1403-1 and 1404-1 of the semiconductor lasers 1403 and 1404, respectively, are individually fit in the fitting holes. The arranging directions of the semiconductor lasers 1403 and 1404 are set such that projection parts 1406-1 and 1407-1 of press members 1406 and 1407, respectively, are engaged with cutout parts of the heat sink parts 1403-1 and 1404-1, respectively. Then semiconductor lasers 1403 and 1404 are fixed to the base member 1405 such that screws 1412 are inserted into the press members 1406 and 1407 from the back surface thereof, and the screws 1412 are screwed in the base member 1405.

Collimate lenses 1408 and 1409 are positioned and adhered to semicircular mounting guide surfaces 1405-4 and 1405-5, respectively, such that the peripheries of the collimate lenses 1408 and 1409 follow the guide surfaces 1405-4 and 1405-5, respectively, so as to perform adjustment in the optical axis directions, and diverging beams emitted from light emitting points become parallel beams.

It should be noted that, in this embodiment, setting is made such that beams of light from the semiconductor lasers 1403 and 1404 cross in the main scan surface. Thus, the central axis lines of the semiconductor laser fitting holes of the base member 1405 and those of the semicircular mounting guide surfaces 1405-4 and 1405-5 are formed to be inclined.

A cylindrical engaging part 1405-3 of the base member 1405 is engaged with an engaging hole of a holder member 1410. The base member 1405 is fixed to the holder member 1410 such that screws 1413 inserted into through-holes 1410-2 and 1410-3 are screwed into threaded holes 1405-6 and 1405-7 of the base member, respectively. In this manner, the light beam source unit is constituted.

The holder member 1410 of the light beam source unit is adhered to and maintained on the backside of a mounting wall 1411 such that a cylindrical part 1410-1 of the holder member 1410 is fit in a reference hole 1411-1 provided on the mounting wall 1411 of an optical housing, a spring 1611 is inserted from the obverse side, and a stopper member 1612 is engaged with a projection 1410-3 of the cylindrical part 1410-1. One end of the spring 1611 is hooked on a projection 1411-2 so as to generate a turning force having the center of the cylindrical part 1410-1 as the rotating axis. The pitch between laser beams is adjusted such that the whole unit is rotated only for an angle θ around the optical axis by an adjustment screw 1613 that is provided so as to lock the turning force. Aperture 1415 is provided with slits corresponding to the semiconductor lasers 1403 and 1404. The aperture 1415 is attached to the optical housing and regulates the exit diameters of the optical beams.

Figure 29A:
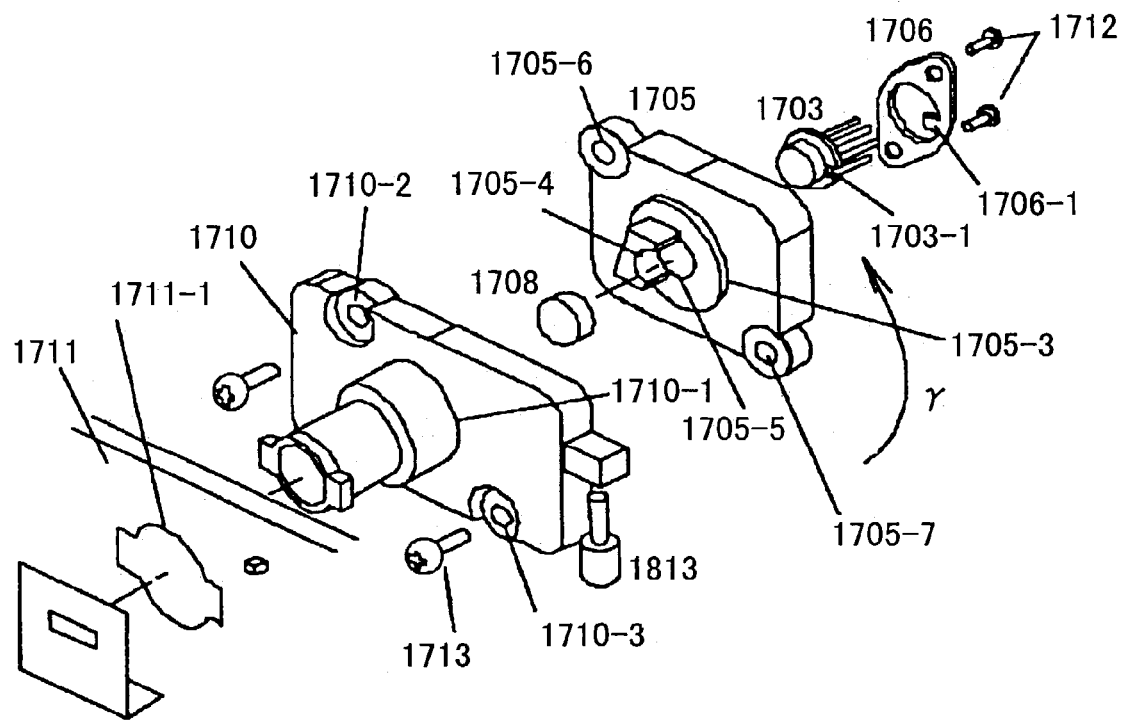
FIG. 29A is an exploded perspective view showing another example of a light source unit that can be applied to the present invention.
Figure 29B:
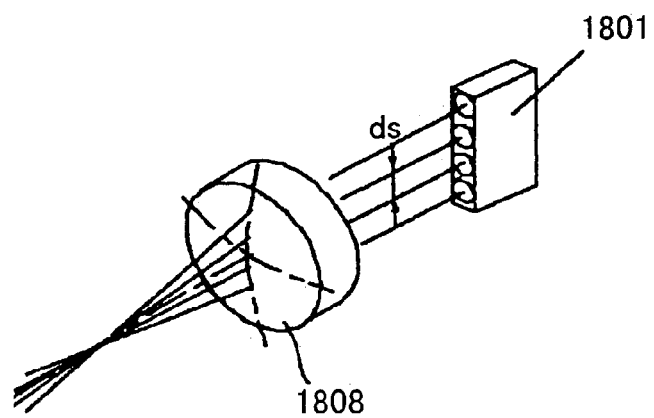
FIG. 29B is a perspective view showing a monolithic semiconductor laser array and a collimate lens in detail.

FIGS. 29A and 29B show a second embodiment of the light source unit. In this embodiment, the light beam source is constituted by a multi-beam light source, and at the same time, the multi-beam light source is formed by a monolithic semiconductor laser array. In FIG. 29A, a semiconductor laser array 1703 is engaged with a fitting hole 1705-5 of a base member 1705, guided by a mounting guide surface 1705-4, and at the same time, a heat sink part 1703-1 of the semiconductor laser array 1703 is adhered to the base member 1705. A press member 1706 is applied to the heat sink part 1703-1 from behind. The semiconductor laser array 1703 is fixed to the base member 1705 with the press member 706 by screws 1712. A collimate lens 1708 is arranged ahead of the semiconductor laser array 1703, which collimate lens 1708 also serves as a beam combining means.

The basic components of the example of the structure shown in FIG. 29A are the same as those components of the example of the structure shown in FIG. 28. Thus, the other components are only listed with the reference numerals, and a description thereof will be omitted. A reference numeral 1710 designates a holder member, 1710-1 designates a cylindrical part, 1710-2 and 1710-3 designate through-holes of screws 1713, 1705-6 and 1705-7 designate threaded holes into which the screws 1713 is screwed 1711 designates a mounting wall of an optical housing, 1711-1 designates a reference wall provided to the mounting wall 1711, and 1813 designates a screw.

FIG. 29B shows examples of the monolithic semiconductor laser array and the collimate lens in more detail. Optical beams from a semiconductor laser array 1801 having four light sources are combined by using a collimate lens 1808 that also serves as a light beam combining means. The other components are the same as those components of the example in FIG. 29A, and thus illustration thereof is omitted.

Each light beam of multi beams passes along almost the same light path in the laser scan optical system, scans the surface to be scanned of the photo conductor, and forms an electrostatic latent image on the surface to be scanned. Thus, it is possible to consider that the dot position shift of each beam is almost the same degree. Accordingly, it is possible to correct the dot position shift in the main scan direction by using only one beam of a multi-beam light source and measuring the scan time thereof. Hence, it is possible to simplify the circuit configuration. That is, it is possible to realize the control circuit that does not complicate the synchronization circuit and the phase shift circuit, and further reduces the memory requirement.

Figure 30:
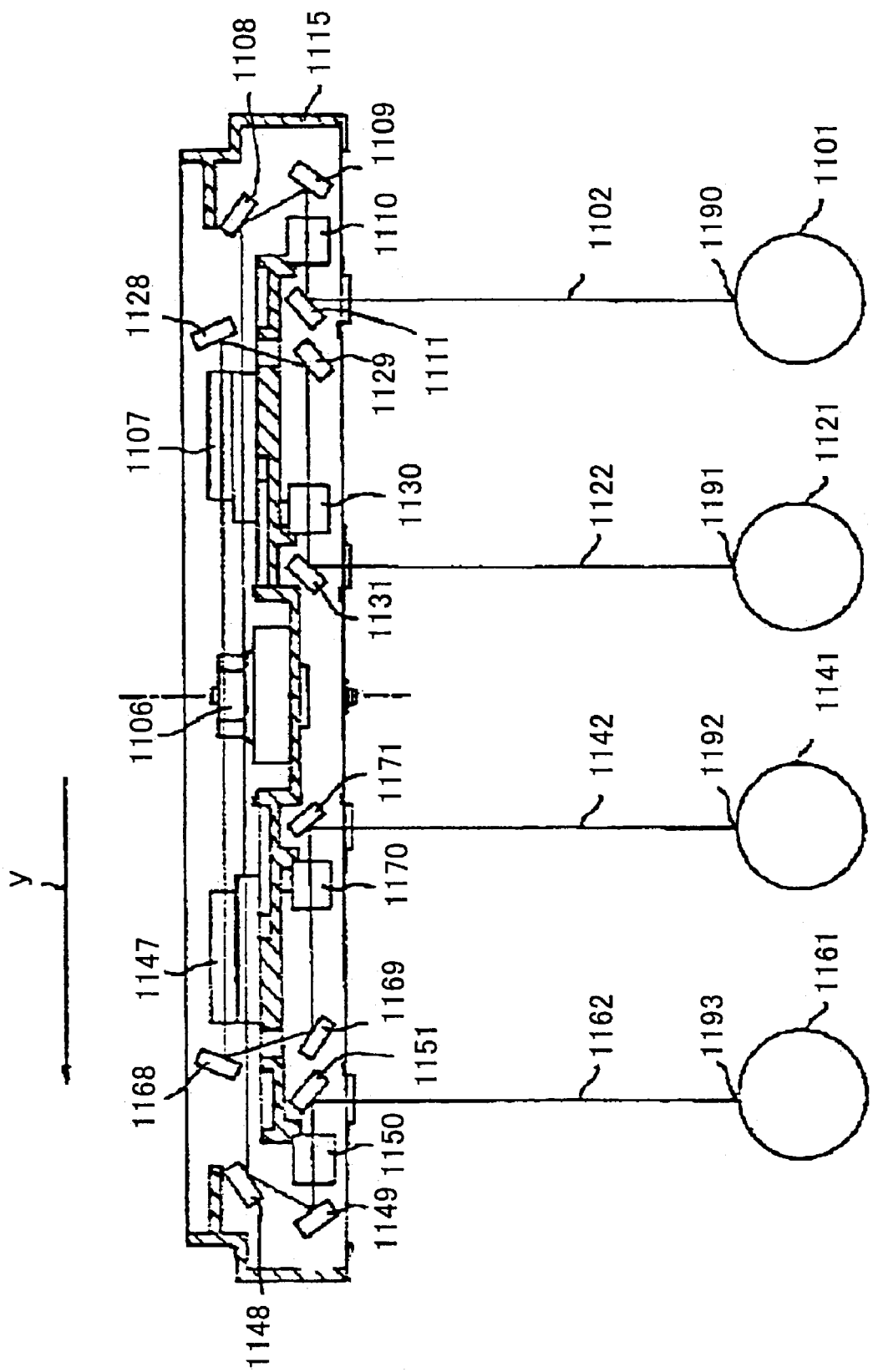
FIG. 30 is a side view showing an example of a tandem color image forming apparatus, which is an embodiment of the image forming apparatus according to the present invention.

The laser scan device of which explanation has been given above can effectively exert the effect when applied to a tandem color image forming apparatus having a plurality of photo conductors. FIG. 30 shows an example of the tandem color image forming apparatus.

In the tandem color image forming apparatus, separate photo conductors corresponding to cyan, magenta, yellow and black are required, and laser scan optical systems form, corresponding to the respective photo conductors, latent images via separate light paths. Thus, in many cases, the dot position shift in the main scan direction occurring on each of the photo conductors is different from color to color. Therefore, by applying the laser scan device to the tandem color image forming apparatus, it is possible to correct the dot position shift in the main scan direction corresponding to each of the colors cyan, magenta, yellow and black, and to effectively reduce color shift due to the dot position shift.

In FIG. 30, a polygon mirror 1106 as an optical deflector is arranged in an optical housing 1115. Respective multi beams emitted from multi-beam light sources 1107 and 1147 that are arranged on both sides of the polygon mirror 1106 are reflected (deflected) by reflection (deflection) surfaces of the polygon mirror 1106. The light path of one beam 1102, which is reflected (deflected), is bent by mirrors 1108 and 1109, passes a scan optical system 1110, is reflected by mirror 1111 and converged, as a light spot, on a surface 1190 to be scanned of a photo conductor drum 1101. The light spot scans the surface 1190 to be scanned so that an image signal is written. Similarly, another deflected (reflected) beam 1122 is converged, as a light spot, on a surface 1191 to be scanned of a photo conductor drum 1121 via mirrors 1128 and 1129, a scan optical system 1110, and a mirror 1131. The light spot scans the surface 1191 to be scanned so that an image signal is written. Still another deflected (reflected) beam 1142 is converged, as a light spot, on a surface 1192 to be scanned of a photo conductor drum 1141 via mirrors 1168 and 1169, a scan optical system 1170, and a mirror 1171. The light spot scans the surface 1192 to be scanned so that an image signal is written. Further, another deflected (reflected) beam 1162 is converged, as a light spot, on a surface 1193 to be scanned of a photo conductor drum 1161 via mirrors 1148 and 1149, a scan optical system 1150, and a mirror 1151. The light spot scans the surface 193 to be scanned so that an image signal is written.

The above-described four photo conductor drums 1101, 1121, 1141 and 1161 are arranged in parallel at proper intervals. Image signals corresponding to cyan, magenta, yellow and black are written thereon and electrostatic latent images are formed. Each of the electrostatic latent images is developed with a toner of each of the colors. A full color image is formed on a sheet of transfer paper such that toner images of the respective colors are transferred onto, the transfer paper in a superposing manner.

In the optical scan device, it is preferable to vary the frequency of the pixel clock. FIGS. 31A through 31F show examples of the dot position shift in the main scan direction of such a case. FIGS. 31A and 31B show dot position shift characteristic in the main scan direction in an initial state (linearity=0 at the center of image height) of two kinds of laser scan optical systems.

FIGS. 31C and 31D show examples in which whole dot position shift amounts in the main scan direction is shifted to the positive side and the negative side by varying the frequency of the pixel clock to a lower frequency and a higher frequency, respectively, in each of the optical systems.

FIGS. 31E and 31F show examples in which phase data are set so as to make the average value of dot position shift amounts after phase shift equal to 0 by obtaining the average value of the dot position shift amounts in all image height ratios and performing the phase shift on all the image heights (the average value of the linearity is set to 0).

In this embodiment, the dot position shift characteristic in the main scan direction is varied by fine adjusting the frequency of the pixel clock performing image forming.

When the pixel clock is set to a lower frequency, as shown in FIG. 31C, the dot position shift amounts are all shifted to the positive direction. Thus, in this embodiment, by making the dot position shift 0 in the image height ratio ±1, it is possible to set the start position of writing with high accuracy.

On the other hand, when the pixel clock is set to a higher frequency, as shown in FIG. 31D, the dot position shift amounts are all shifted to the negative direction. Thus, in this embodiment, by making the dot position shift amounts in the main direction have negative values, it is possible to set the dot position shifts in the main direction in the vicinity of medium image height with high accuracy.

Next, a description will be given of another embodiment of the optical scan device according to the present invention. This embodiment is characterized by including a temperature sensor and a look-up table to which the relationship between the temperature change and the phase shift is recorded beforehand, and characterized in that each dot position of image data in the effective writing area is corrected to an arbitrary position based on the temperature change.

With respect to a method of measuring the scan time as in the aforementioned embodiment, in this embodiment, the temperature sensor directly monitors the temperature change. Through preliminary experiments and simulations, the characteristic values of the relationship between the ideal image height and the actual image height of the laser scan optical system to be used are determined in advance. Based on the characteristic values, data of correction amounts with respect to the temperature changes are recorded as the look-up table. Each dot position of image data is corrected to an arbitrary position based on a measured result of temperature by the temperature sensor of the laser scan optical system.

It is preferable that the temperature sensor be mounted in the vicinity of an optical element relating to the variation of the dot position shift in the main scan direction, for example, in the vicinity of a scan lens having the greatest optical power in the main scan direction.

Figure 32:
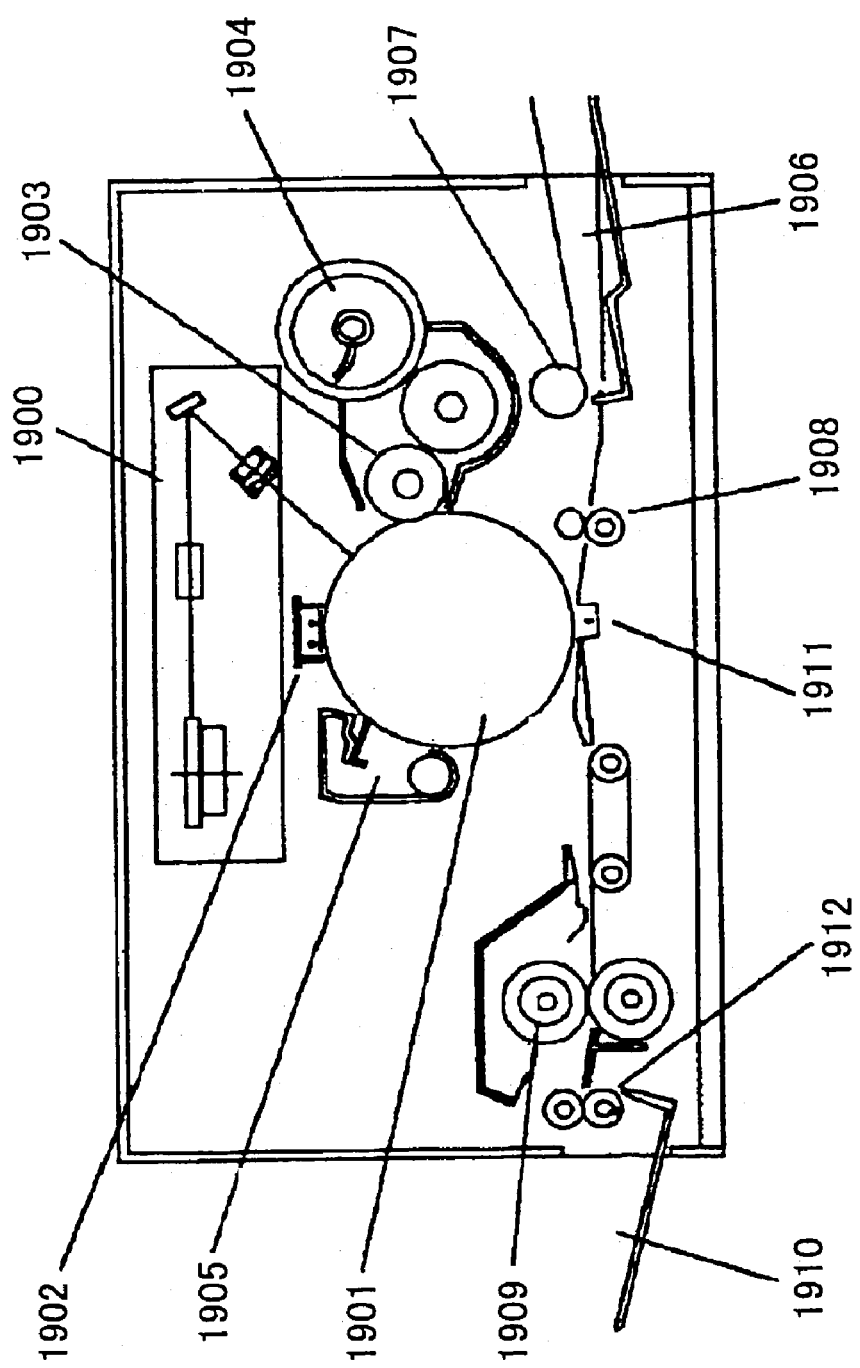
FIG. 32 is a front view showing another embodiment of the image forming apparatus according to the present invention.

It is possible to apply the above-described optical scan device to an image forming apparatus. FIG. 32 generally shows such an example. In FIG. 32, an optical scan device 1900 having an optical deflector that deflects (reflects) beams from a light source and the like is mounted in the housing of an image forming apparatus. A photo conductor drum 1901 having a surface to be scanned is arranged below the optical scan device 1900. Each unit for carrying out a known electrophotography process is arranged around the photo conductor drum 1901. That is, a charge unit 1902, a developing unit having a developing roller 1903, a toner supplying roller 1904 and the like, a transfer unit 1911, a cleaning unit 1905, and the like.

In addition, the image forming apparatus includes a transfer paper tray 1906 storing transfer papers, a supply roller 1907 supplying the transfer papers from the tray 1906, a resist roller 1908 that positions the supplied transfer papers and feeds the transfer papers in the transfer unit 1911 matching the timing with a toner image on the photo conductor drum 1901, a transfer roller 1909 that heat fuses the toner image transferred to the transfer paper, a delivering roller 1912 delivering the transfer paper on which the image is fixed, a receiving tray 1910 receiving the delivered transfer papers, and the like. The optical scan device 1900 handles an exposure process in the electrophotography process. An electrostatic latent image is formed on the surface of the photo conductor drum 1901 such that laser beams modulated according to image signal scan the surface of the photo conductor drum 1901 that is equally charged by the charge unit 1902, and thus the surface of the photo conductor drum 1901 is exposed according to the image signal. The electrostatic latent image is developed by the developing unit, and transferred and fixed onto a sheet of transfer paper. In this manner, the image is formed on the sheet of transfer paper.

With the optical scan device and the image forming apparatus using the optical scan device according to the above-described embodiments, it is possible to obtain a high-quality image, since the dot position shift in the main scan direction is finely corrected. Especially, in a case of a color image, the dot position shift in the main scan direction of each color is finely corrected. Thus, it is possible to obtain an image having little color shift and good color reproduction characteristic.

The present invention is not limited to the specifically disclosed embodiments, and variations and modifications may be made without departing from the scope of the present invention.

The present application is based on Japanese priority applications No. 2001-387921 filed on Dec. 20, 2001 and No. 2002-129318 filed on Apr. 30, 2002, the entire contents of which are hereby incorporated by reference.

What is claimed is:

1. An image forming method using an image forming apparatus configured to scan a plurality of media, the image forming apparatus comprising:
   a plurality of light beam source parts configured to emit light beams modulated by image data and pixel clock data from corresponding pixel clocks, the emitted light beams corresponding in number to the plurality of media to be scanned;
   a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;
   a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;
   a plurality of temperature detectors configured to detect temperature information indicating temperatures of the plurality of scan optical systems; and
   a plurality of scanning light beam detectors, each scanning light beam detector being configured to detect a corresponding separate scanning light beam at a predetermined position with respect to a corresponding one of the media being scanned and to output a corresponding detection signal,
   the image forming method comprising the steps of:
   scanning each different one of the media using the image forming apparatus with a predetermined timing based on the corresponding detection signal so as to form the scanned image on each different one of the plurality of media;
   correcting a displacement of scan positions of each of the scanned images on each of the plurality of media being scanned by adjusting a phase of the corresponding pixel clock based on the temperature information detected by the plurality of temperature detectors; and
   forming a superposed image by superposing the scanned images formed on each different one of the plurality of media.

2. The image forming method as claimed in claim 1, wherein the plurality of scan optical systems are fθ optical systems changing constant angular velocity scan of the deflector separate scanning portions to constant linear velocity scan.

3. The image forming method as claimed in claim 1, wherein at least one of the plurality of light beam source parts includes a semiconductor laser array.

4. The image forming method as claimed in claim 1, wherein the plurality of light beam source parts each include at least one semiconductor laser.

5. The image forming method as claimed in claim 4, wherein a difference of oscillation wavelength in modulation among semiconductor laser light beams from the semiconductor lasers is within 10 nm.

6. The image forming method as claimed in claim 4, wherein a wavelength variation in modulation between pulses of each semiconductor laser light beam from the semiconductor lasers is within 2 nm.

7. The image forming method as claimed in claim 4, wherein each of the scan optical systems satisfies $|\Delta\lambda \times dH/d\lambda| < 5$ μm where $\Delta\lambda$ is a wavelength variation within a single pulse of a laser light beam being transmitted by each of the scan optical systems, and $dH/d\lambda$ is a chromatic difference of magnification of each of the scan optical systems.

8. The image forming method as claimed in claim 1, wherein at least one of the plurality of light beam source parts includes a plurality of semiconductor laser arrays.

9. An image forming apparatus configured to scan a plurality of media, comprising:
  a plurality of light beam source parts configured to emit light beams modulated by image data and pixel clock data from corresponding pixel clocks, the emitted light beams corresponding in number to the plurality of media to be scanned;
  a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;
  a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;
  a plurality of temperature detectors configured to detect temperature information indicating temperatures of the plurality of scan optical systems; and
  a plurality of scanning light beam detectors, each scanning light beam detector being configured to detect a corresponding separate scanning light beam at a predetermined position with respect to a corresponding one of the plurality of media being scanned and to output a corresponding detection signal,
  wherein the image forming apparatus is configured to:
  scan each different one of the plurality of media with a predetermined timing based on the corresponding detection signal so as to form the scanned image on each different one of the plurality of media,
  correct a displacement of scan positions of each of the scanned images on each of the plurality of media being scanned by adjusting a phase of the corresponding pixel clock based on the temperature information detected by the plurality of temperature detectors, and
  form a superposed image by superposing the scanned images formed on each different one of the plurality of media.

10. An image forming method using an image forming apparatus configured to scan a plurality of media, the image forming apparatus comprising:
  a plurality of light beam source parts configured to emit light beams modulated by image data and pixel clock data from corresponding pixel clocks, the emitted light beams corresponding in number to the plurality of media to be scanned, the light beam source parts each including a semiconductor laser as a light beam source;
  a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;
  a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;
  a plurality of temperature detectors configured to detect temperatures close to each of the light beam source parts; and
  a plurality of scanning light beam detectors, each scanning light beam detector being configured to detect a corresponding separate scanning light beam at a predetermined position with respect to a corresponding one of the plurality of media being scanned and to output a corresponding detection signal,
  the image forming method comprising the steps of:
  scanning each different one of the plurality of media using the image forming apparatus with a predetermined timing based on the corresponding detection signal so as to form the scanned image on each different one of the plurality of media;
  correcting a displacement of scan positions of each of the scanned images on each of the plurality of media being scanned by adjusting a phase of the corresponding pixel clock based on the temperature information detected by the plurality of temperature detectors; and
  forming a superposed image by superposing the scanned images formed on each different one of the plurality of media.

11. The image forming method as claimed in claim 10, wherein the plurality of scan optical systems are fθ optical systems changing constant angular velocity scan of the deflector separate scanning portions to constant linear velocity scan.

12. The image forming method as claimed in claim 10, wherein less light beam source parts than the plurality of media being scanned are provided and at least one of the plurality of light beam source parts includes a semiconductor laser array.

13. The image forming method as claimed in claim 10, wherein less light beam source parts than the plurality of media being scanned are provided and at least one of the plurality of light beam source parts includes a plurality of semiconductor lasers.

14. The image forming method as claimed in claim 10, wherein less light beam source parts than the plurality of media being scanned are provided and at least one of the plurality of light beam source parts includes a plurality of semiconductor laser arrays.

15. The image forming method as claimed in claim 10, wherein a difference of oscillation wavelength in modulation among semiconductor laser light beams from the semiconductor lasers is within 10 nm.

16. The image forming method as claimed in claim 10, wherein a wavelength variation in modulation between pulses of each of the light beams from each semiconductor laser light beam source is within 2 nm.

17. The image forming method as claimed in claim 10, wherein each of the scan optical systems satisfy $|\Delta\lambda \times dH/$ dλ|<5 µm where Δλ is a wavelength variation within a single pulse of the light beam emitted from each semiconductor laser light beam source, and dH/dλ is a chromatic difference of magnification of each of the scan optical systems.

18. An image forming apparatus, comprising:
a plurality of light beam source parts configured to emit light beams modulated by image data and pixel clock data from corresponding pixel clocks, the emitted light beams corresponding in number to the plurality of media to be scanned, the light beam source parts each including a semiconductor laser as a light beam source;
a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;
a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;
a plurality of temperature detectors configured to detect temperatures close to each of the light beam source parts; and
a plurality of scanning light beam detectors, each scanning light beam detector being configured to detect a corresponding separate scanning light beam at a predetermined position with respect to a corresponding one of the plurality of media being scanned and to output a corresponding detection signal,
wherein the image forming apparatus is configured to:
scan each different one of the plurality of media with a predetermined timing based on the corresponding detection signal so as to form the scanned image on each different one of the plurality of media,
correct a displacement of scan positions of each of the scanned images on each of the plurality of media being scanned by adjusting a phase of the corresponding pixel clock based on the temperature information detected by the plurality of temperature detectors, and
form a superposed image by superposing the scanned images formed on each different one of the plurality of media.

19. An image forming method using an image forming apparatus configured to scan a plurality of media, the image forming apparatus comprising:
a plurality of light beam source parts configured to emit light beams modulated by image data and pixel clock data from corresponding pixel clocks, the emitted light beams corresponding in number to the plurality of media to be scanned;
a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;
a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;
a temperature detector configured to detect temperature close to the rotating motor of the deflector; and
a plurality of scanning light beam detectors, each scanning light beam detector being configured to detect a corresponding separate scanning at a predetermined position with respect to a corresponding one of the plurality of media being scanned and to output a corresponding detection signal,
the image forming method comprising the steps of:
scanning each different one of the plurality of media using the image forming apparatus with a predetermined timing based on the corresponding detection signal so as to form the scanned image on each different one of the plurality of media;
correcting a displacement of scan positions of each of the scanned images on each of the plurality of media being scanned by adjusting a phase of the corresponding pixel clock based on the temperature information detected by the temperature detector; and
forming a superposed image by superposing the scanned images formed on each different one of the plurality of media.

20. The image forming method as claimed in claim 19, wherein the plurality of scan optical systems are fθ optical systems changing constant angular velocity scan of the deflector separate scanning portions to constant linear velocity scan.

21. The image forming method as claimed in claim 19, wherein at least one of the plurality of light beam source parts includes a semiconductor laser array.

22. The image forming method as claimed in claim 19, wherein the plurality of light beam source parts each include at least one semiconductor laser.

23. The image forming method as claimed in claim 22, wherein a difference of oscillation wavelength in modulation among semiconductor laser light beams from the semiconductor lasers is within 10 nm.

24. The image forming method as claimed in claim 22, wherein a wavelength variation in modulation between pulses of each semiconductor laser light beam from the semiconductor lasers is within 2 nm.

25. The image forming method as claimed in claim 22, wherein each of the scan optical systems satisfies |Δλ×dH/dλ|<5 µm where Δλ is a wavelength variation within a single pulse of a laser light beam being transmitted by each of the scan optical systems, and dH/dλ is a chromatic difference of magnification of each of the scan optical systems.

26. The image forming method as claimed in claim 19, wherein at least one of the plurality of light beam source parts includes a plurality of semiconductor laser arrays.

27. An image forming apparatus, comprising:
a plurality of light beam source parts configured to emit light beams modulated by image data and pixel clock data from corresponding pixel clocks, the emitted light beams corresponding in number to the plurality of media to be scanned;
a deflector configured to be driven by a rotating motor, the deflector having a plurality of separate scanning portions less in number than the number of the plurality of media, the separate scanning portions being configured to cause each emitted light beam received from the plurality of light beam source parts to be deflected so as to form separate scanning light beams, each separate scanning light beam being used to scan a corresponding different one of the plurality of media;

a plurality of scan optical systems corresponding in number to the plurality of media, each one of the scan optical systems being configured to receive each separate scanning light beam from the plurality of separate scanning portions and to project each separate scanning light beam onto the corresponding different one of the plurality of media to form a scanned image thereon;

a temperature detector configured to detect temperature close to the rotating motor of the deflector; and a plurality of scanning light beam detectors, each scanning light beam detector being configured to detect a corresponding separate scanning light beam at a predetermined position with respect to a corresponding one of the plurality of media being scanned and to output a corresponding detection signal, wherein the image forming apparatus is configured to:

scan each different one of the plurality of media with a predetermined timing based on the corresponding detection signal so as to form the scanned image on each different one of the plurality of media, correct a displacement of scan positions of each of the scanned images on each of the plurality of media being scanned by adjusting a phase of the corresponding pixel clock based on the temperature information detected by the temperature detector, and form a superposed image by superposing the scanned images on each different one of the plurality of media.

28. An optical scan device having an optical deflector configured to deflect a light beam from a light beam source and having a surface scanned by the deflected light beam from the deflector so as to write information on the surface, the optical scan device comprising:

optical detectors arranged at least at a start side of writing location and an end side of writing location, the start side of writing location and the end side of writing location being outside of an effective writing area;

a measuring part configured to measure a scan time required by the light beam deflected by the optical deflector to scan a range between the optical detectors at the start side of writing location and the end side of writing location;

an estimation part configured to estimate offset of a dot position based on a relationship between a characteristic value and the scan time measured by the measuring part; and a correcting part configured to shift the dot position of image data in the effective writing area to an arbitrary position based on the offset estimate of the estimation part.

29. The optical scan device as claimed in claim 28, wherein the effective writing area is divided into a plurality of image data areas, and a correction value is set for each of the image data areas.

30. The optical scan device as claimed in claim 28, wherein shift of the dot position to the arbitrary position is performed by phase shifting a pixel clock based on a high-frequency clock having a higher frequency than that of the pixel clock.

31. The optical scan device as claimed in claim 28, wherein the light beam source is a multi-beam light source constituted by a plurality of semiconductor lasers and a part optically combining laser light beams from the plurality of semiconductor lasers, or by a monolithic semiconductor laser array.

32. An optical scan device having an optical deflector configured to deflect a light beam from a light beam source and having a surface scanned by the deflected light beam from the deflector so as to write information on the surface, the optical scan device comprising:

optical detectors arranged at least at a start side of writing location and an end side of writing location, the start side of writing location and the end side of writing location being outside of an effective writing area;

a measuring part configured to measure a scan time required by the light beam deflected by the optical deflector to scan a range between the optical detectors at the start side of writing location and the end side of writing location;

a look-up table configured to record in advance a relationship between the scan time in the area between the optical detectors and a correction amount for shifting the dot position to an arbitrary position; and a correction part configured to shift each dot position of image data in the effective writing area to the arbitrary position based on the look-up table, wherein a phase shift amount for obtaining the arbitrary position is set based on a measured result of the scan time.

33. The optical scan device as claimed in claim 32, wherein the effective writing area is divided into a plurality of image data areas, and a correction value is set for each of the image data areas.

34. The optical scan device as claimed in claim 32, wherein shift of the dot position to the arbitrary position is performed by phase shifting a pixel clock based on a high-frequency clock having a higher frequency than that of the pixel clock.

35. The optical scan device as claimed in claim 32, wherein the light beam source is a multi-beam light source constituted by a plurality of semiconductor lasers and a part optically combining laser light beams from the plurality of semiconductor lasers, or by a monolithic semiconductor laser array.

36. An optical scan device having an optical deflector deflecting a light beam from a light beam source so as to deflect the light beam and having a surface to be scanned on which information is written such that the light beam deflected by the deflector scans the surface, the optical scan device comprising:

a temperature sensor;

a look-up table configured to record in advance a relationship between a temperature change detected by the temperature sensor and a corresponding phase shift to be applied to a pixel clock; and a correcting part configured to shift each dot position of image data in an effective writing area to an arbitrary position based on the temperature change and the corresponding phase shift being applied to the pixel clock.

37. An image forming apparatus, comprising:

an optical deflector configured to deflect a light beam from a light beam source;

a surface scanned by the deflected light beam from the deflector so as to write information on the surface;

optical detectors arranged at least at a start side of writing location and an end side of writing location, the start side of writing location and the end side of writing location being outside of an effective writing area;

a measuring part configured to measure a scan time required by the light beam deflected by the optical deflector to scan a range between the optical detectors at the start side of writing location and the end side of writing location;

an estimation part configured to estimate offset of a dot position based on a relationship between a characteristic value and the scan time measured by the measuring part; and a correcting part configured to shift the dot position of image data in the effective writing area to an arbitrary position based on the offset estimate of the estimate part.

38. An image forming apparatus, comprising:

an optical deflector configured to deflect a light beam from a light beam source;

a surface scanned by the deflected light beam from the optical deflector so as to write information on the surface;

a temperature sensor;

a look-up table configured to record in advance a relationship between a temperature change detected by the temperature sensor and a corresponding phase shift to be applied to a pixel clock; and a correcting part configured to shift each dot position of image data included in said information in an effective writing area to an arbitrary position based on the temperature change and the corresponding phase shift being applied to the pixel clock, wherein an electrostatic latent image is formed on the surface being scanned as said information, the image forming apparatus being further configured to develop and transfer the electrostatic latent image onto a sheet of transfer paper.

* * * * *